United States Patent [19]

Morita et al.

[11] Patent Number: 5,622,436
[45] Date of Patent: Apr. 22, 1997

[54] ROLLING BEARING UNIT FITTED WITH A ROTATIONAL SPEED DETECTION UNIT

[75] Inventors: Kouichi Morita; Hideo Ouchi; Junshi Sakamoto, all of Fujisawa, Japan

[73] Assignee: NSK Ltd., Tokyo, Japan

[21] Appl. No.: 513,030

[22] Filed: Aug. 9, 1995

[30] Foreign Application Priority Data

| Aug. 11, 1994 | [JP] | Japan | 6-189276 |
| Dec. 8, 1994 | [JP] | Japan | 6-305053 |
| Jan. 30, 1995 | [JP] | Japan | 7-12969 |
| Feb. 17, 1995 | [JP] | Japan | 7-29560 |
| May 31, 1995 | [JP] | Japan | 7-133601 |

[51] Int. Cl.⁶ .................................................. F16C 19/08
[52] U.S. Cl. ............................................ 384/448; 384/446
[58] Field of Search .................................... 384/448, 446, 384/513, 512, 537, 569

[56] References Cited

U.S. PATENT DOCUMENTS 3,500,091  3/1970  Jones .
5,140,261  8/1992  Seo et al. .
5,296,805  3/1994  Clark et al. .
5,332,964  7/1994  Ouchi .

FOREIGN PATENT DOCUMENTS 0557931   9/1993  European Pat. Off. .
3-99676  10/1991  Japan .
1504791   3/1978  United Kingdom .

Primary Examiner—Lenard A. Footland
Attorney, Agent, or Firm—Evenson, McKeown, Edwards & Lenahan, P.L.L.C.

[57] ABSTRACT

A bearing unit with a rotational speed detection unit has a tone wheel which has recesses on its outer peripheral surface and rotates with the magnetic hub and the inner ring, a sensor which has a first stator with notches and a second stator, and a permanent magnet, so that due to the changes in phase of the notches and recesses, the density of the magnetic flux from the permanent magnet is changed, with the magnetic flux led to the second stator and to the hub and inner ring, whereby the number of winding in the coil is increased.

15 Claims, 20 Drawing Sheets

ROLLING BEARING UNIT FITTED WITH A ROTATIONAL SPEED DETECTION UNIT

BACKGROUND OF THE INVENTION

The present invention relates to a rolling bearing unit fitted with a rotational speed detection unit (referred to hereunder as a speed sensing rolling bearing unit), used for rotatably supporting a vehicle wheel on a suspension unit, and detecting the rotational speed of the wheel.

DESCRIPTION OF THE RELATED ART

There are various known constructions for a speed sensing rolling bearing unit for rotatably supporting a vehicle wheel on a suspension unit, and detecting the rotational speed of the wheel to enable control of an anti-lock braking system (ABS) or a traction control system (TCS).

The rotational speed detection units fitted to this type of speed sensing rolling bearing unit, all incorporate a tone wheel which rotates together with the vehicle wheel, and a sensor which outputs a signal having a frequency proportional to the rotational speed of the tone wheel.

As to the types of tone wheel and sensor, there are already a number of known types. One of these is a so called passive type which uses a magnetic material for the tone wheel, so that a voltage induced in a coil of the sensor, changes corresponding to rotation of the tone wheel. Since expensive components are not required, this type is widely used.

With such passive type rotational speed detection units, it is known as disclosed in European Patent Publication No. 0 426 298 A1, or Hatsumei Kyokai Kokai Technical Report (Japanese) No. 94-16051 that the sensor can be formed in an annular shape to increase sensor output.

FIGS. 20 and 21 show a speed sensing rolling bearing unit as disclosed in the abovementioned Kokai Technical Report, which has an inner ring assembly comprising a hub 1 and an inner ring 5. The hub 1 is formed with a flange 2 for wheel fixture, on an outer peripheral face of its axially outer end (here "axially outer end" means the outer end in a widthwise direction when fitted to a vehicle; to the left in the figures), and formed with an inner ring raceway 3a and a step 4 on its central outer peripheral surface. Furthermore, the inner ring 5 which constitutes the inner ring assembly together with the hub 1, is formed with an inner ring raceway 3b on an outer peripheral face thereof, and is externally fitted to the outer peripheral face of an axially inner end of the hub 1 with an axially outer end face thereof abutted against the step 4 (here "axially inner end" means the end towards the center in a widthwise direction when fitted to a vehicle; to the right in the figures).

There is also the case where, instead of directly forming the inner ring raceway 3a on the outer peripheral surface of the hub 1, it is formed on an inner ring (not shown) separate from the hub 1, which is externally fitted to the hub 1 together with the inner ring 5.

A threaded portion 6 is formed on a portion of the hub 1 near the axially inner end thereof. The inner ring assembly is thus assembled by fixing the inner ring 5 at a predetermined location on the outer peripheral face of the hub 1 by means of a nut 7 which is threaded onto the threaded portion 6 and tightened.

An outer ring 8 is located around the hub 1 and provided with an attachment portion 9 on a central outer peripheral face thereof, for fixing the outer ring 8 to a suspension unit (not shown). An inner peripheral face of the outer ring 8 is formed with outer ring raceways 10a, 10b opposite to the inner ring raceways 3a, 3b respectively.

A plurality of rolling bodies or members 11 are respectively provided between the inner ring raceways 3a, 3b and the outer ring raceways 10a, 10b, so that the hub 1 is free to rotate inside the outer ring 8.

With the example shown in FIGS. 20, 21, balls are used for the rolling bodies 11. However in the case of a rolling bearing unit for heavy vehicles, tapered rollers may be used.

A seal ring 12 is fitted between the inner peripheral face of the outer ring 8 at its axially outer end, and the outer peripheral face of the hub 1, to cover the axially outer end opening of the space in which the plurality of rolling bodies or members 11 are provided between the inner peripheral face of the outer ring 8 and the outer peripheral face of the hub 1.

A tone wheel 13 is formed in an overall annular shape (short cylinder shape) from a magnetic metal plate such as a steel plate, and comprised of a smaller diameter portion 14 and larger diameter portion 15 which are formed concentric with each other and connected by a step portion 16. The larger diameter portion 15 (left end in FIG. 20, 21) of the tone wheel 13 is externally fixed to a portion on an axially inner end of the inner ring 5 which is away from the inner ring raceway 3b. The tone wheel 13 is fixedly supported on the inner ring 5 with the larger diameter portion 15 externally fitted to the outer peripheral face of the inner ring 5 at the axially inner end of the inner ring 5, and with the step portion 16 abutted against the axially inner end rim of the inner ring 5. Consequently, the smaller diameter portion 14 is supported concentric with the inner ring 5.

A plurality of apertures or through-holes 17 (forming a rotating cutout section) are formed in the smaller diameter portion 14 at even spacing around the circumference, so that the magnetic characteristics in the circumferential direction change alternately at an even spacing. The apertures 17 are formed in the same rectangular shape with the long side aligned with the axial direction (left/right direction in FIGS. 20, 21).

An axially inner end opening of the outer ring 8 is covered with a cover 18 made in the form of a bottomed cylinder, by for example press forming or drawing a metal plate of stainless steel, or aluminum alloy and the like.

An annular sensor 20 is embedded in annularly formed synthetic resin 21 and fixedly retained within an inner peripheral side of a cylindrical portion 19 of the cover 18. The sensor 20 comprises a permanent magnet 22, a stator 23 made from a magnetic material such as steel plate, and a coil 24, formed in an annular shape by encapsulating the permanent magnet 22, stator 23, and coil 24 inside the synthetic resin 21.

As to the respective members constituting the sensor 20, the permanent magnet 22 is formed as an overall ring shape (annular shape), magnetized in the radial direction. The inner peripheral face of the permanent magnet 22 is opposed, across a small clearance 25, to an outer peripheral face of a base end portion of the smaller diameter portion 14 of the tone wheel 13 in which the apertures 17 are not formed.

The stator 23 is formed in an overall annular shape of approximate J shape in cross section to form radially outer and inner cylindrical portions 26, 27. The radially outer cylindrical portion 26 of the stator 23 has an inner peripheral face on an axially outer end thereof located near to or in abutment with an outer peripheral face of the permanent magnet 22. An inner peripheral face of the radially inner cylindrical portion 27 of the stator 23 is faced to a portion of the smaller diameter portion 14 of the tone wheel 13 in which the apertures 17 are formed.

Furthermore a plurality of cut-outs 28 forming a stationary cutout section are formed in the radially inner cylindrical portion 27 around the circumference with a pitch equal to that of the apertures 17 (central angle pitch). The radially inner cylindrical portion 27 is thus formed with comb like teeth.

The coil 24 is formed as an annular shape by winding a wire around a bobbin 29 of a non magnetic material, and is located on an inner peripheral portion of the radially outer cylindrical portion 26 of the stator 23. An induced electromotive force (EMF) produced in the coil 24 is taken out from a connector 30 which protrudes from the external face of the cover 18.

During use of the speed sensing rolling bearing unit of the above construction, when the hub 1 and tone wheel 13 rotate, the flux density in the stator 23 facing the tone wheel 13 changes causing the voltage induced in the coil 24 to change with a frequency proportional to the rotational speed of the hub 1. The theory related to the change in voltage induced in the coil 24 with the change in density of the flux flowing in the stator 23, is similar to that for the well known cases for rotational speed detection sensors.

The reason for the change in density of the flux flowing in the stator 23 with rotation of the tone wheel 13 is as follows:

With the plurality of apertures 17 provided in the tone wheel 13, and the plurality of cut-outs 28 provided in the stator 23, since the pitch is the same, there is a point in time with rotation of the tone wheel 13 wherein they are simultaneously opposed to each other around the whole circumference. Moreover, at that point in time, the column portions of magnetic material between adjacent pairs of apertures 17, and the tongue portions of magnetic material between adjacent pairs of cut-outs 28 are opposed to each other across the small clearance or clearance 25. With the respective column and tongue portions (magnetic bodies) opposed to each other in this way, a high density flux flows between the tone wheel 13 and the stator 23.

On the other hand, if the apertures 17 and the cut-outs 28 are out of phase by one half, the density of the flux flowing between the tone wheel 13 and the stator 23 drops. That is to say, in this condition, the apertures 17 provided in the tone wheel 13 are opposed to the tongue portions, and at the same time the cut-outs 28 provided in the stator 23 are opposed to the column portions. With the respective column portions opposed to the cut-outs 28, and the tongue portions opposed to the apertures 17 in this way, then a relatively large space exists between the tone wheel 13 and the stator 23 around the whole circumference. Therefore, in this condition, the density of the flux flowing between the tone wheel 13 and the stator 23 decreases.

As a result of this, the voltage induced in the coil 24 changes in proportion to the rotational speed of the hub 1.

The sensor 20 functions in the above manner, with the output voltage induced in the coil 24 changing with a frequency proportional to the rotational speed of the hub 1.

With this construction, there is an annular space within the end opening of the outer ring 8 which is necessarily formed by providing the outer ring 8. There is thus the possibility of installing the sensor 20 into this limited space, while making the output of the sensor 20 sufficiently large, so that the rotational speed of the vehicle wheel rotating with the hub 1 can be accurately detected. That is to say, the permanent magnet 22, the stator 23 and the coil 24 which constitute the sensor 20 are formed in an annular shape so as to respectively surround the whole circumference of the tone wheel 13. Also, since the flux output from the permanent magnet 22 flows around the whole circumference of the stator 23, the amount of flux flowing inside the stator 23 can be sufficiently increased for the whole stator 23. Accordingly, the voltage change in the coil 24 with the change in density of the flux passing through the stator 23 can be increased.

With the rotational speed detection unit incorporating the known annular sensor 20 constructed and used as described above, a larger output can be obtained compared to the heretofore known device constructed with a rod shape sensor.

Incidentally, in order to sufficiently maintain the output of a sensor with a small size construction which can be fitted into a small vehicle, the following points require consideration.

The simplest method of increasing the output of the sensor 20 to enable accurate detection of the rotational speed of a wheel, is to increase the size of the sensor 20. However, in the case of the sensor 20 in a speed sensing rolling bearing unit for use in small vehicles, it is difficult to have a size increase involving an increase in outer diameter and axial thickness dimensions. Accordingly, to increase the output of a sensor in a speed sensing rolling bearing unit for use in small vehicles, it is necessary to have a construction whereby a larger output can be obtained with effective utilization of the limited space, without increasing the outer diameter and the thickness dimensions.

For example, in the case of the conventional configurations shown in FIGS. 20 and 21, the flux flowing between the inner and outer peripheral faces, that is, between the end faces in the magnetized direction of the permanent magnet 22, flows in a closed magnetic circuit including the tone wheel 13 and the stator 23. Furthermore the coil 24 in which a voltage is induced with a change in density of the flux flowing in the closed magnetic circuit, is juxtaposed axially with the permanent magnet 22. To increase the output of the sensor 20, i.e. the voltage induced in the coil 24, an effective method is to increase the number of windings of the coil 24. However, with the conventional configurations shown in FIGS. 20 and 21, if the number of windings is increased, the size of the sensor 20 is increased.

Also, to increase the output of the sensor 20, an effective method is to increase the peripheral speed of the portion on the tone wheel 13 which is faced to the sensor 20. However, with the conventional configurations shown in FIGS. 20 and 21, since the tone wheel 13 is located diametrically inward of the sensor 20, the diameter of the sensor 20 must be increased in order to increase the peripheral speed. If the diameter of the sensor 20 is increased, the whole body of the rotational speed detection unit is increased in size, so that not only does assembly into a small size vehicle become difficult, but also, although the number of windings of the coil 24 may be the same, the overall length of the wire is increased. Any increase in the overall length of the wire involves an increase in resistance, which thus detracts from any benefit resulting from the increase in output of the sensor 20.

SUMMARY OF THE INVENTION

A speed sensing rolling bearing unit according to the present invention has been developed through consideration of such circumstances, the object of the invention being to effectively utilize the space so as to enable a sufficient increase in the number of windings to obtain a sufficient output increase effect.

Specifically, the sensor, e.g. the coil of the sensor, is located diametrically inward of the tone wheel having cutouts to be detected. One end in magnetized direction of the permanent magnet is faced to a first portion of the tone wheel either directly or through a stator with the other end face in magnetized direction of the permanent magnet faced to a portion of the inner ring assembly or a second portion of the tone wheel, directly or through a stator, wherein at least one of the first and second portions of the tone wheel is formed with the cutouts to be detected.

With the speed sensing rolling bearing unit according to the present invention, the support of a vehicle wheel on the suspension unit so as to rotate freely, or the operation itself when detecting the rotational speed of the wheel, is substantially the same as for the beforementioned conventional configurations. However, with the speed sensing rolling bearing unit of the present invention, the peripheral speed of the tone wheel can be increased as well as the pitch of the cutouts in the rotating cutout section. Moreover the number of windings of the wire in the sensor can be increased without an increase in overall length of the wire, so that an output increase of the sensor is achieved. Furthermore, space is effectively utilized so that a sufficient increase in the number of windings, and a sufficiently large output increase effect can be obtained.

Other objects and aspects of the present invention, will become apparent from the following description of embodiments given in conjunction with the appended drawings.

DESCRIPTION OF THE PREFERRED EMBODIMENTS

Figure 1:
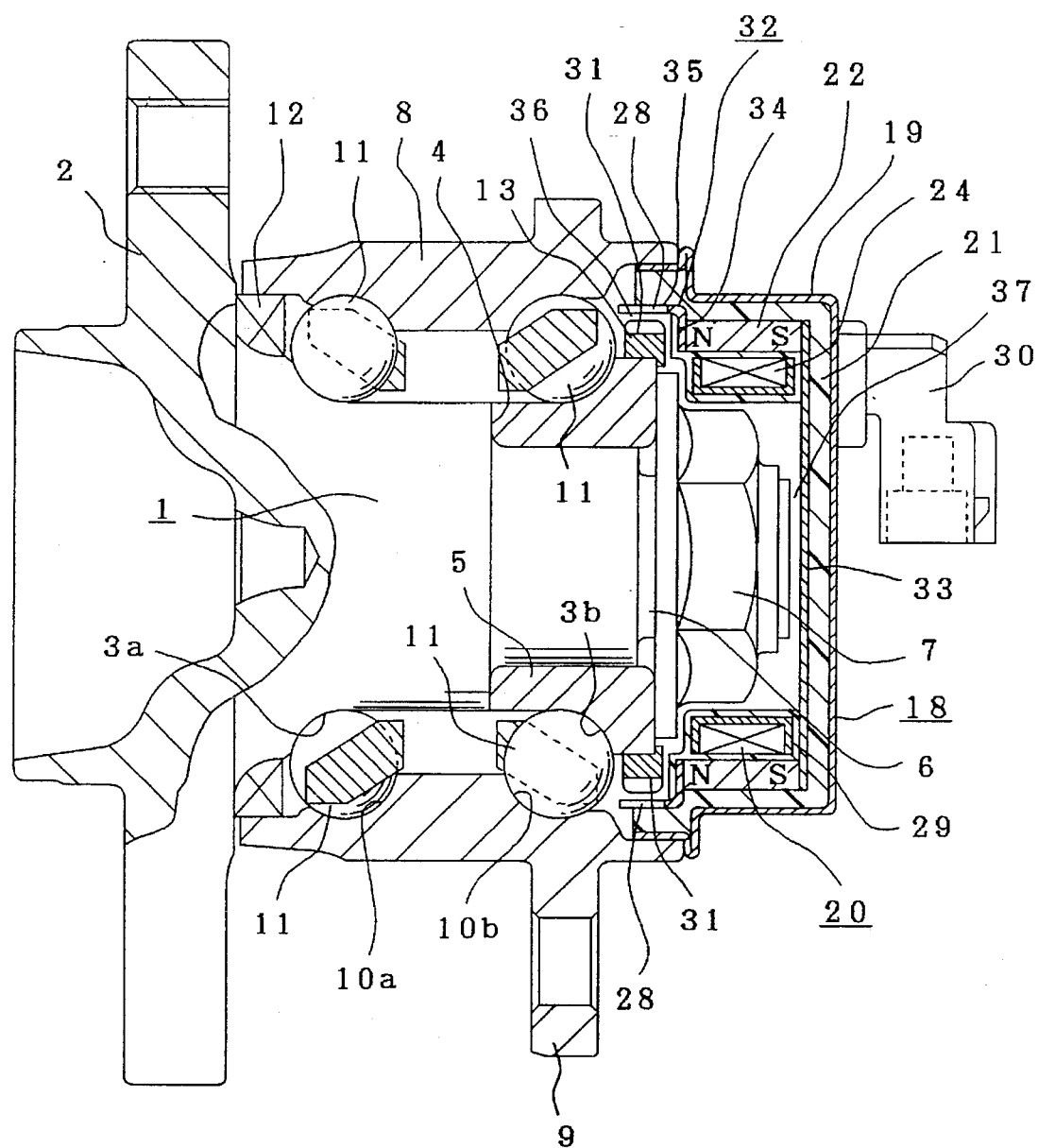
FIG. 1 is a cross sectional view of a first embodiment of the present invention.

The speed sensing rolling bearing unit according to the present invention, as with the beforementioned conventional speed sensing rolling bearing unit, incorporates an outer ring which does not rotate during use and has a double row outer ring raceway on an inner peripheral face thereof, an inner ring assembly which rotates during use and has a double row inner ring raceway on an outer peripheral face thereof opposite to the inner peripheral face, a plurality of rotating bodies provided so as to be freely rotatable between the outer ring raceway and the inner ring raceway, an annular tone wheel made from a magnetic material, fixed to an end portion of the inner ring assembly, and has a rotating cutout section for detection provided with a plurality of cutouts evenly spaced around the circumference, a cover fixed to an axially inner end opening portion of the outer ring, and an annular sensor incorporating a coil, a permanent magnet and a stator of respective annular shapes and embedded in a synthetic resin retained in the cover so as to be faced to the rotating cutout section for detection of the tone wheel.

In a first aspect of the present invention, with the speed sensing rolling bearing unit of the present invention, the coil of the sensor is located diametrically inward than the rotating cutout section for detection on the tone wheel.

According to a second aspect of the speed sensing rolling bearing unit of the present invention, the inner ring assembly is made of a magnetic material, and the sensor incorporates; an annular permanent magnet magnetized in a predetermined one direction around the whole circumference, at least one stator made from a magnetic material with one end portion located close to or in contact with at least one of two end faces in magnetized direction of the permanent magnet, and an annular coil located along a part where the flux from the permanent magnet flows.

Furthermore, one end face in magnetized direction of the permanent magnet is faced to the rotating cutout section with cutouts for detection of the tone wheel either directly or through the stator across a first small clearance, and a plurality of cutouts in the stationary cutout section are formed with the same pitch as in the rotating cutout section, in the permanent magnet or the stator at a portion opposite to the rotating cutout section for detection of the tone wheel.

Moreover, the other end face in magnetized direction of the permanent magnet is faced to one part of the surface of the inner ring assembly either directly or through the stator across a second small clearance.

According to a third aspect of the speed sensing rolling bearing unit of the present invention, a nut made of a magnetic material is fixed to the inner ring assembly, such that at least one part of an outer peripheral face of the nut is formed as a cylindrical face concentric with the inner ring assembly.

Moreover, the sensor incorporates an annular permanent magnet magnetized in a predetermined one direction around the whole circumference, at least one stator made from a magnetic material with one end portion located close to or in contact with at least one of two end faces in magnetized direction of the permanent magnet, and an annular coil located along a part where the flux from the permanent magnet flows.

Furthermore, one end face in magnetized direction of the permanent magnet is faced to the portion for detection of the tone wheel either directly or through the stator across a first small clearance, and a plurality of cutouts in the stationary cutout section are formed with the same pitch as in the rotating cutout section, in the permanent magnet or the stator at a portion opposite to the rotating cutout section of the tone wheel. And, the other end face in magnetized direction of the permanent magnet is faced to the cylindrical face of the nut either directly or through the stator across a second small clearance.

According to a fourth aspect of the speed sensing rolling bearing unit of the present invention, the inner ring assembly comprises; a hub for removably fixing a vehicle wheel, an inner ring externally fitted to the hub, and a nut threaded onto a threaded portion on an axially inner end of the hub, for axially pressing the inner ring.

Moreover, the tone wheel incorporates a smaller diameter portion externally fixed to an axially inner end portion of the inner ring, a larger diameter portion located around the periphery of the nut, and a step portion connecting an axially outer end rim of the larger diameter portion to an axially inner end rim of the smaller diameter portion, and the rotating cutout section is provided on at least an inner peripheral face of the larger diameter portion.

The sensor is provided radially inside the larger diameter portion and incorporates an annular permanent magnet magnetized in a predetermined one direction around the whole circumference, at least one stator made from a magnetic material with one end portion located close to or in contact with at least one of two end faces in magnetized direction of the permanent magnet, and an annular coil located along a part where the flux from the permanent magnet flows. The one end face in magnetized direction of the permanent magnet is located magnetically close to and faced to one part of the tone wheel across a first small clearance (the term "magnetically" means a direct or indirect, e.g. through a stator, relationship to make a magnetic circuit portion), and one end portion of the stator is located in contact with or close to the other end face in magnetized direction of the permanent magnet, while the other end portion of the stator is located magnetically close to and faced to another part of the tone wheel across a second small clearance.

Moreover at least one of the one part or the another part of the tone wheel is formed with the rotating cutout section for detection, while a plurality of cutouts in the stationary cutout section are formed, with the same pitch as the rotating cutout section, on at least one of the other end portion of the stator and a part which is magnetically connected to the one end face in magnetized direction of the permanent magnet, so as to be opposite to the rotating cutout section for detection.

Figure 2:
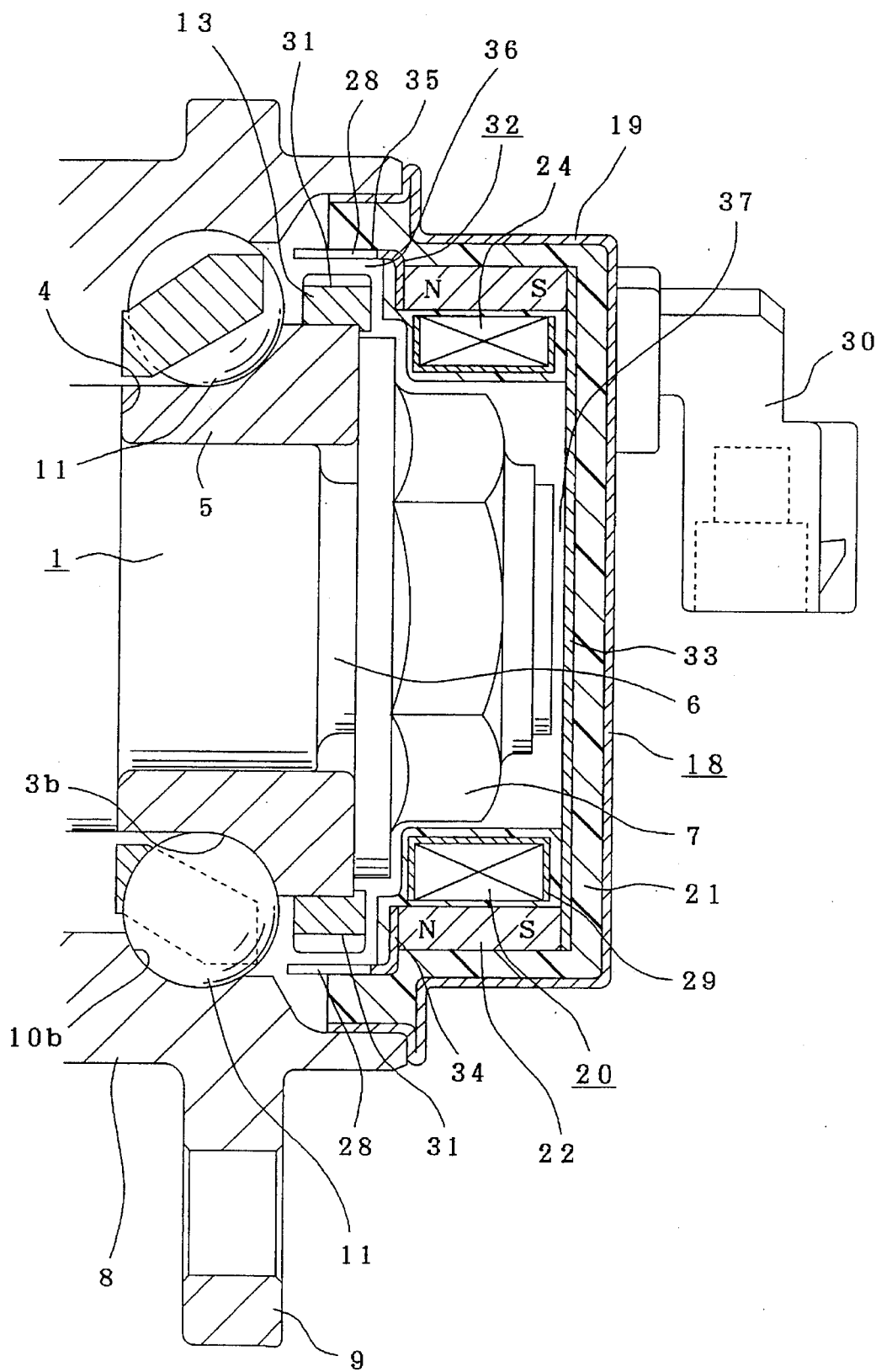
FIG. 2 is an enlarged view of the right hand portion of FIG. 1.

Now, FIGS. 1, 2 show a first embodiment of the present invention according to the second aspect. Since the features of the speed sensing rolling bearing unit according to the present invention are in the rotational speed detection unit section, and the construction of the rolling bearing unit section is the substantially same as for the conventional constructions mentioned beforehand, like symbols are used to identify like members of the rolling bearing unit section, and overlapping description is either omitted or simplified. The following description is centered on the rotational speed detection unit section which is the feature of the present invention.

The rolling bearing unit has a hub 1 and an inner ring 5 of magnetic material which together with the hub 1 of magnetic material constitutes an inner ring assembly.

An annular tone wheel 13 of magnetic material is externally fixed to the axially inner end portion of the inner ring 5. A plurality of recesses 31 which constitute the rotating cutout section are formed in an outer peripheral face of the tone wheel 13 evenly spaced around the circumference. Accordingly, the shape of the outer peripheral face of the tone wheel 13 is in the form of gear like recesses and protrusions.

An open end portion of a cover 18 is internally fixed to the opening portion of the outer ring 8 at its axially inner end. Furthermore, an annular shape sensor 20 is supported in the cover 18, and embedded in a synthetic resin 21.

The sensor 20 incorporates a cylindrical (annular) permanent magnet 22, first and second stators 32, 33 respectively made from a magnetic material such as low carbon steel plate, and an annular coil 24.

The permanent magnet 22 is magnetized around the whole circumference in the axial direction (left/right direction in FIGS. 1 and 2), with the axially outer end face made a north pole around the whole circumference, and the axially inner end face made a south pole around the whole circumference.

The first stator 32 is formed in an overall annular shape of L shape in cross section, and comprised of a ring portion 34, and a cylindrical portion 35 bent axially outward from an outer peripheral rim of the ring portion 34. A plurality of cut-outs 28 which constitute a stationary cutout section are formed in the cylindrical portion 35 at the same pitch as the recesses 31. Accordingly, the cylindrical portion 35 is formed in an annular comb shape.

The inner peripheral face of the cylindrical portion 35 is faced to the outer peripheral face of the tone wheel 13, across a first small clearance 36 in the radial direction.

When forming the cylindrical portion 35 in an annular comb shape, if the cut-outs 28 are punched out in a plate body in the form of a ring to make the comb like teeth, and this part is then bent to give the cylindrical portion 35, then the first stator 32 can be made at low cost. The axially inner side face of the ring portion 34 is abutted against the axially outer end face of the permanent magnet 22.

The second stator 33 is formed as a disc. The axially inner end face of the permanent magnet 22 is abutted against an axially outer side face near the outer circumference of the second stator 33. An axially outer side face at the central portion of the second stator 33 is faced to the axially inner end face of the threaded portion 6 formed on the axially inner end portion of the hub 1 in the thrust direction across a second small clearance 37.

The coil 24 is formed by winding wire onto a bobbin 29 and fitted at the diametrically inner side of the permanent magnet 22.

With the speed sensing rolling bearing unit of the present invention constructed as described above, the magnetic flux flowing between the axially inner/outer end face pair which constitute the two end faces in the magnetized direction of the permanent magnet 22, flows in a closed magnetic circuit formed by the tone wheel 13, the first and second stators 32, 33, and the hub 1 and inner ring 5 arranged in series. The density of the magnetic flux flowing in this closed magnetic circuit changes with the phase change of the recesses 31 and the cut-outs 28 with rotation of the tone wheel 13.

That is to say, at the point in time wherein the recesses 31 and the cut-outs 28 are opposed to each other, the protrusions between the adjacent pairs of recesses 31, and the tongue portions between adjacent pairs of cut-outs 28 are opposed to each other. As a result, the magnetic resistance between the tone wheel 13 and the first stator 32 is reduced so that the density of the flux flowing in the abovementioned closed magnetic circuit increases. On the other hand, at the point in time wherein the recesses 31 and the cut-outs 28 are out of phase by one half, the protrusions between the adjacent pairs of recesses 31 are opposed to the cut-outs 28, while the tongue portions between the adjacent pairs of cut-outs 28 are opposed to the recesses 31. As a result, the magnetic resistance between the tone wheel 13 and the first stator 32 increases so that the density of the flux flowing in the closed magnetic circuit decreases. Therefore, with the density change in the flux flowing in the closed magnetic circuit, a voltage is induced in the coil 24 to change with a frequency proportional to the rotational speed of the tone wheel 13.

With the speed sensing rolling bearing unit of the first embodiment, by arranging the coil 24 on the inner diameter side of the permanent magnet 22, the axial dimension of the coil 24 can be increased, so that the number of windings of wire can be increased to give an increase in the output. Moreover, since the inner diameter of the coil 24 can be made small so long as the coil 24 does not interfere with the nut 7, then even with an increase in the number of windings of wire, the length of the wire does not become excessive so that the increase in resistance of the wire is minimum. Consequently there is a significant output increase effect due to the increase in number of windings. Moreover, the outer diameter of the tone wheel 13 formed with the recesses 31 in the rotating cutout section can be increased giving an increase in output due to an increase in peripheral speed.

With the speed sensing rolling bearing unit of the present invention as described above, the various members making up the sensor can be assembled together by effectively utilizing the limited space between the outer peripheral face of the nut 7 and the inner peripheral face of the cylindrical portion 19 of the cover 18. As a result, it is possible to construct a speed sensing rolling bearing unit of small size and with a sufficiently large output from the sensor 20. In particular, with the construction of the present embodiment shown in FIG. 1, wherein the tone wheel 13 is fixed to the outer peripheral face of the inner ring 5 at its axially inner end, a size reduction of the rotational speed detection unit is achieved by effectively utilizing the space between this outer peripheral face of the inner ring 5 and the corresponding inner peripheral face of the outer ring 8. Furthermore, since the diameter of the tone wheel 13 can be increased without increasing the diameter of the coil 24 of the sensor 20, this has a significant effect on the increase in output of the sensor 20.

Figure 3:
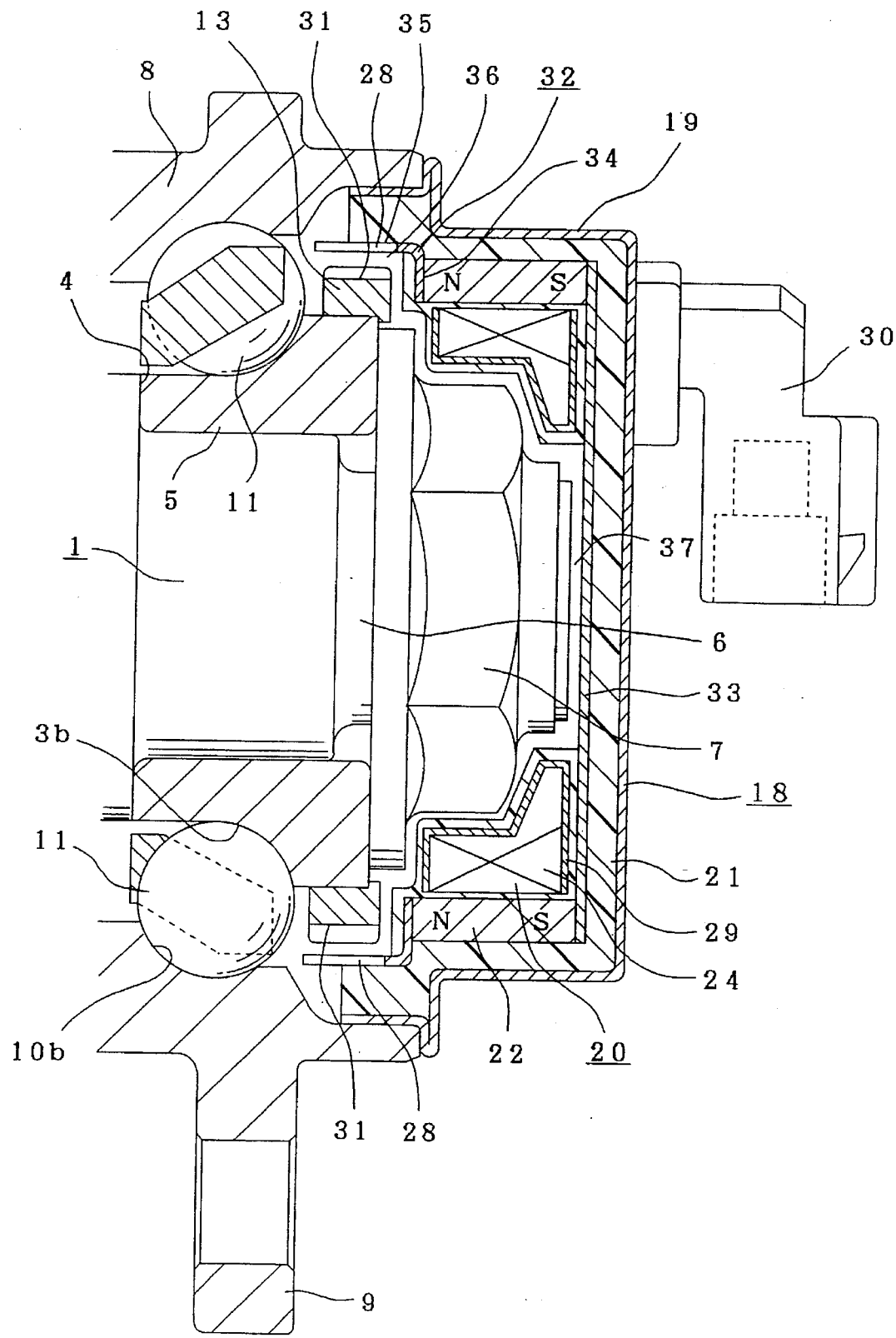
FIG. 3 is an enlarged view similar to FIG. 2 showing a second embodiment of the present invention.

FIG. 3 shows a second embodiment of the present invention also according to the second aspect. With this embodiment the number of windings of wire of a coil 24 is further increased by providing the coil 24 to radially extend in as far as to between the axially inner end face of the nut 7 and the axially outer face of the second stator 33. The output of the sensor 20 can thus be further increased compared to that for the first embodiment, by the amount due to the increased number of windings. Other details of the construction and operation are the same as for the abovementioned first embodiment.

Figure 4:
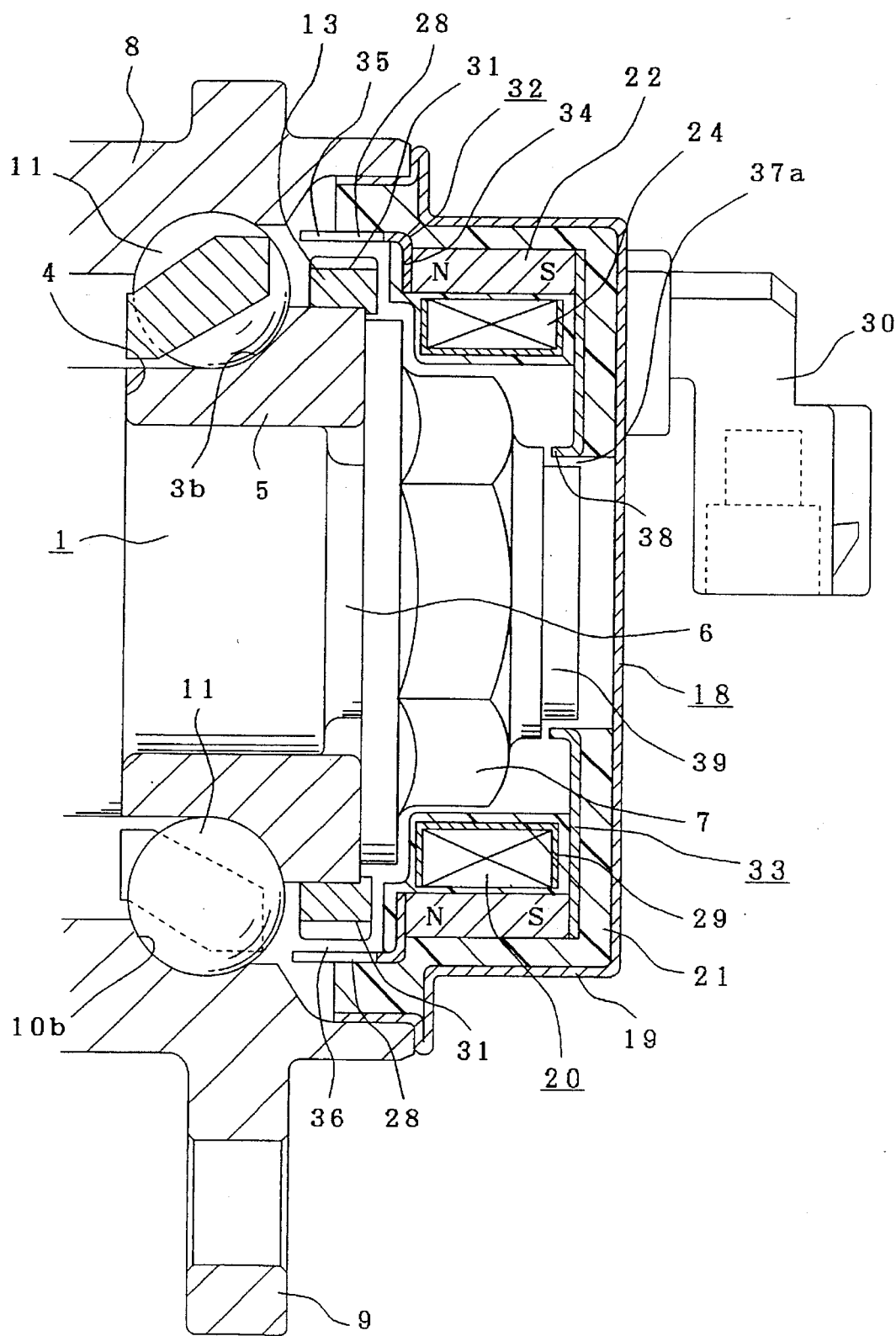
FIG. 4 is an enlarged view similar to FIG. 2 showing a third embodiment of the present invention.

FIG. 4, shows a third embodiment of the present invention. With this embodiment, a second stator 33 of a sensor 20 is formed in a ring shape, with an inner peripheral rim bent axially outward to form a cylindrical portion 38. Furthermore, an unthreaded shaft portion 39 having a diameter less than the root diameter of the threaded portion 6, is formed on the hub 1 so as to protrude axially inwards from the nut 7 at the tip end of the threaded portion 6. The inner peripheral face of the cylindrical portion 38 is faced to the outer peripheral face of the shaft portion 39 radially across a second small clearance 37a.

Compared to axial machining, the diameter of the cylindrical portion 38 can be easily machined to a small tolerance. Accordingly, the second small clearance 37a can be kept small so that a sufficient output can be obtained. Furthermore, since the cylindrical portion 38 can be made by burring, so that low cost is possible. Other details of the construction and operation are substantially the same as for the beforementioned first embodiment.

Figure 5:
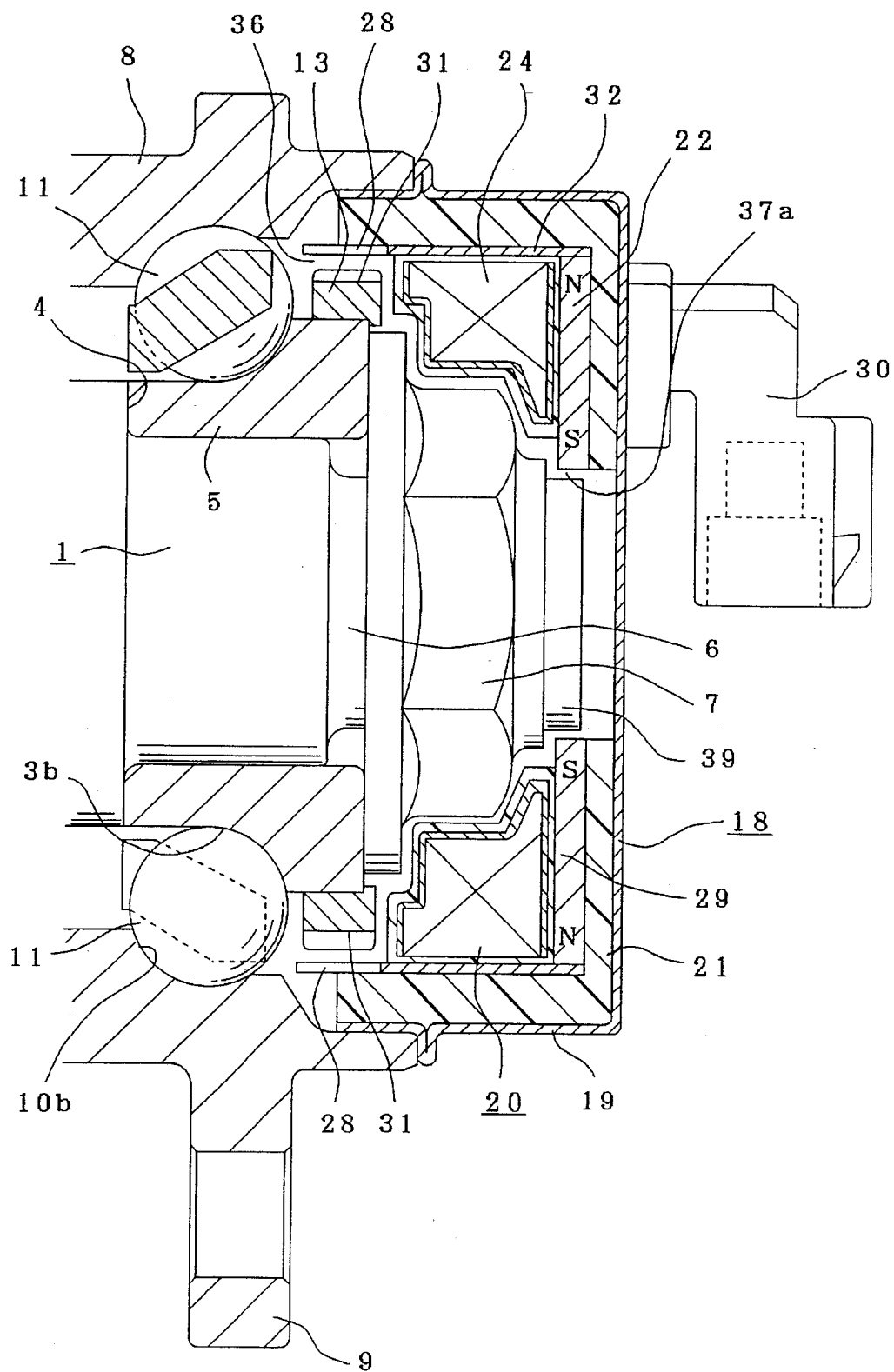
FIG. 5 is an enlarged view similar to FIG. 2 showing a fourth embodiment of the present invention.

FIG. 5 shows a fourth embodiment of the present invention also according to the second aspect. With this embodiment, a first stator 32 of a sensor 20 is made as a simple cylinder, and the second stator is omitted. A stationary cutout section with a plurality of cut-outs 28 is formed in an axially outer end rim of the first stator 32, with the stationary cutout section faced to the outer peripheral face of the tone wheel 13 across the first small clearance or clearance 36. Moreover, a permanent magnet 22 formed in a ring shape is magnetized in the radial direction.

With the embodiment shown in FIG. 5, the inner peripheral face of the permanent magnet 22 is made a south pole around the whole circumference, while the outer peripheral face is made a north pole around the whole circumference. Moreover, an inner peripheral face of the permanent magnet 22 is faced to an outer peripheral face of the unthreaded shaft portion 39 formed at the axially inner tip end of the threaded portion 6 on the hub 1, across a second small clearance 37a. With such a sensor 20, the interaction causing the change in the induced voltage in the coil 24 with rotation of the tone wheel 13 is substantially the same as for the abovementioned respective embodiments.

Figure 6:
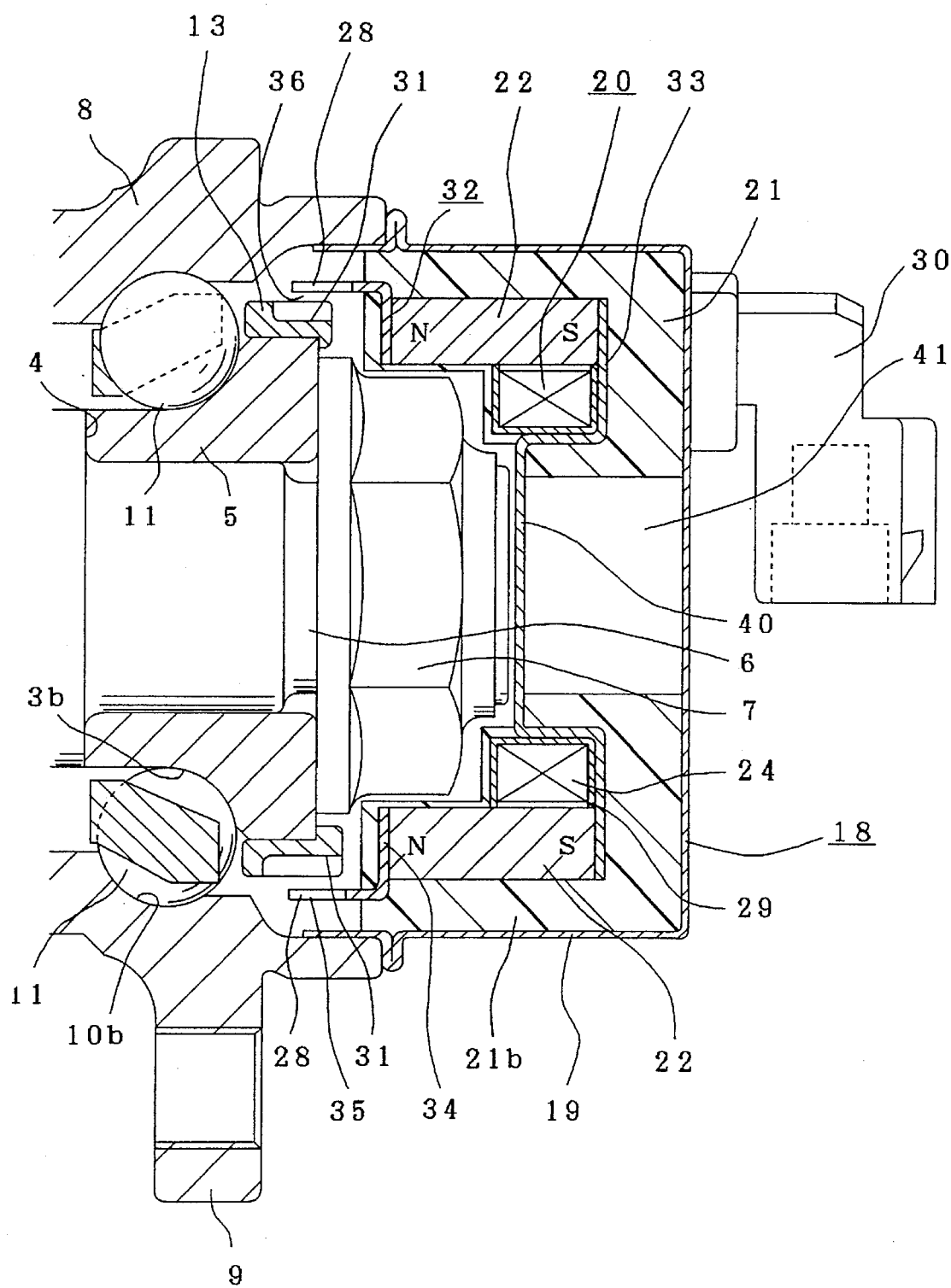
FIG. 6 is an enlarged view similar to FIG. 2 showing a fifth embodiment of the present invention.

FIG. 6 shows a fifth embodiment of the present invention also according to the second aspect. With this embodiment, a sensor 20 has a second stator 33 which is formed as an overall disc shape with a hat shape in cross section, and a coil 24 is fitted between an inner peripheral face of a permanent magnet 22 and an outer peripheral face of a protrusion 40 formed at a diametrically central portion of the second stator 33.

With this construction, since the second stator 33 also acts to center the coil 24, so that the coil 24 is located during assembly, thus simplifying assembly of the speed sensing rolling bearing unit.

A cavity 41 is provided in a diametrically central portion of the synthetic resin 21 in which the sensor 20 is encapsulated, enabling a saving in synthetic resin 21.

A tone wheel 13 is made of a sintered material with a plurality of recesses 31 in the rotating cutout section formed on the outer peripheral face at the axially inner end portion. The axially outer end portion wherein the recesses 31 are not formed can thus keep its thickness enough, so that when the tone wheel 13 is press fitted to the inner ring 5, the occurrence of failure due to fracture and the like can be avoided.

Other details of the construction and operation are substantially the same as for the beforementioned first embodiment.

Figure 7:
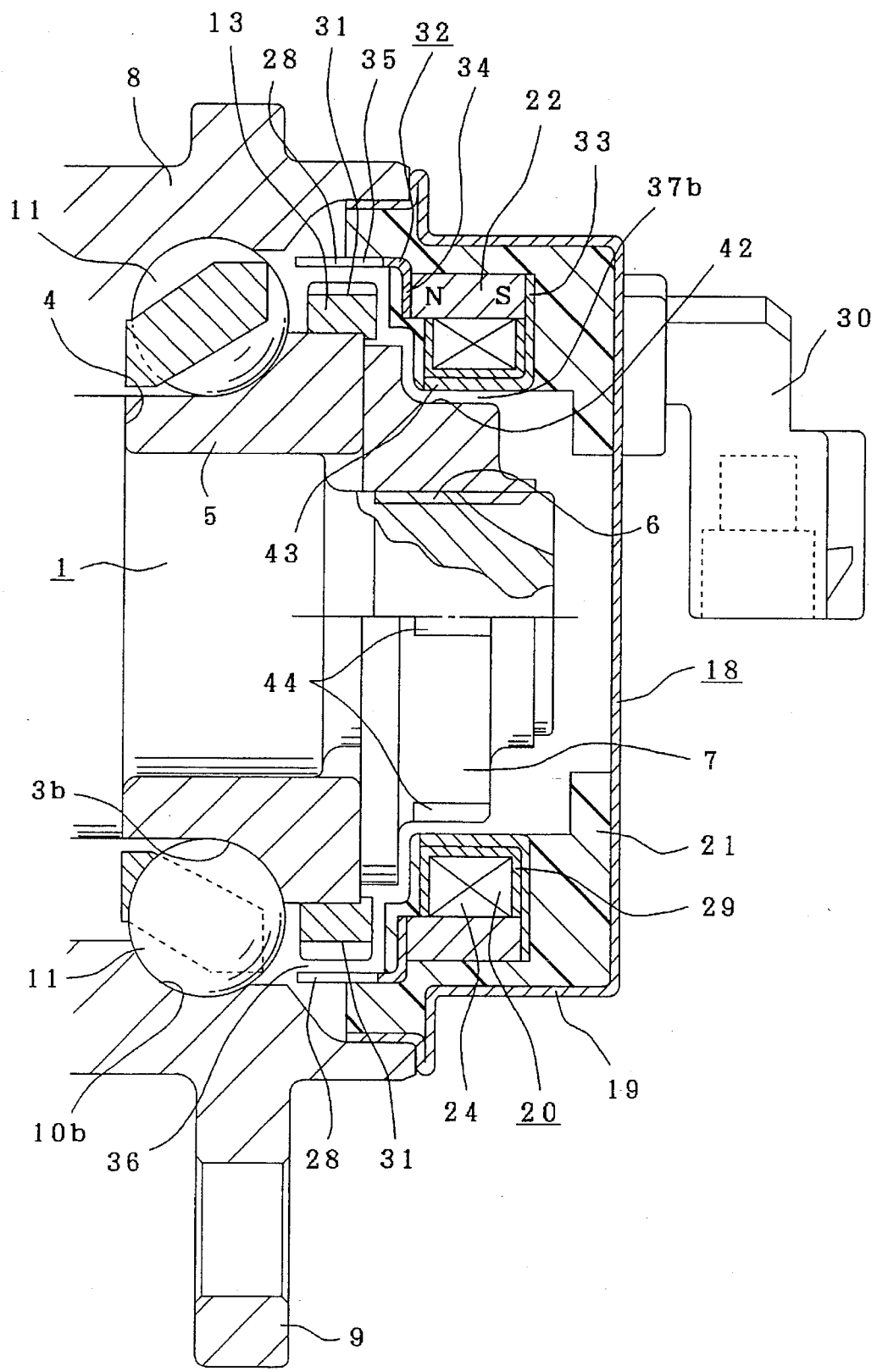
FIG. 7 is an enlarged view similar to FIG. 2 showing a sixth embodiment of the present invention.

FIG. 7 shows a sixth embodiment of the present invention according to the third aspect. With this embodiment, an cylindrical surface 42 concentric with the inner ring 5 is formed on an axially central portion of the nut 7 of magnetic material which is threadedly engaged and fixed onto the threaded portion 6 on the hub 1 to press against the inner ring 5.

Moreover, a second stator 33 of a sensor 20 has a cylindrical portion 43 for an inner peripheral face, so as to be formed in an overall annular shape of L shape in cross section. The second stator 33 also has an outer peripheral end portion the axially outer face of which is abutted against an axially inner end face of the permanent magnet 22 which is magnetized in the axial direction (left/right direction in FIG. 7).

An inner peripheral face of the cylindrical portion 43 is faced to the cylindrical surface 42 of the nut 7 across a second small clearance 37b. Axially extending grooves 44 are formed at a plurality of locations (for example four locations) around the circumference of the cylindrical surface 42 of the nut 7, so as to be freely engageable with a tool for tightening the nut 7.

As for the first stator 32 and the tone wheel 13, these are substantially the same as for the beforementioned first embodiment.

With the speed sensing rolling bearing unit constructed as described above, the magnetic flux flowing between the axially inner and outer end faces which constitute the two end faces in magnetized direction or magnetic orientation of the permanent magnet 22, flows in a closed magnetic circuit formed by the tone wheel 13, the first and second starors 32, 33, and the inner ring 5 and the nut 7 which presses against the inner ring 5.

The density of the magnetic flux flowing in this closed magnetic circuit, as with the beforementioned first embodiment, changes with the phase change of the recesses 31 and the cut-outs 28 with rotation of the tone wheel 13. Due to the change in magnetic flux density, the voltage induced in the coil 24 changes. Now even with rotation of the grooves 44 in the nut 7, since the opposing area of the cylindrical surface 42 of the nut 7 and the inner peripheral face of the cylindrical portion 43 of the second stator 33 does not change, any effect of the grooves 44 due to rotation of the nut 7 does not appear in the output voltage.

Figure 8:
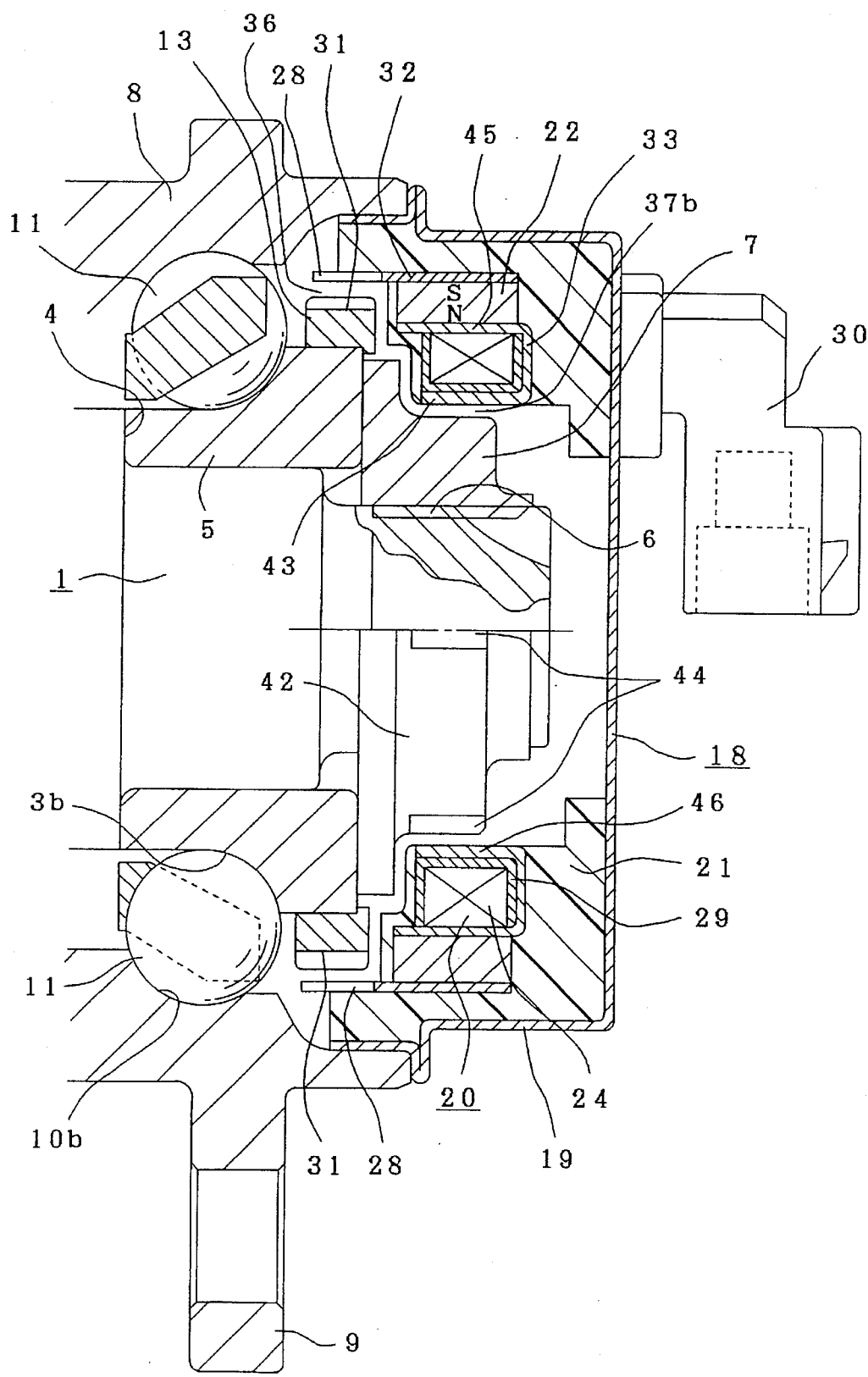
FIG. 8 is an enlarged view similar to FIG. 2 showing a seventh embodiment of the present invention.

FIG. 8 shows a seventh embodiment of the present invention. With this embodiment, a permanent magnet 22 of a sensor 20 is formed in a cylindrical shape and magnetized in the radial direction. Moreover a first stator 32 is formed in a cylindrical shape with an axially inner half thereof arranged close to or abutted against an outer peripheral face of the permanent magnet 22. Cut-outs 28 are formed in an axially outer half of the first stator 32. A second stator 33 is formed in a U shape or a J shape and comprised of a cylindrical portion 45 on the radially outside and a cylindrical portion 46 on the radially inside. An outer peripheral face of the cylindrical portion 45 of the second stator 33 is arranged close to or abutted against an inner peripheral face of the permanent magnet 22. Similarly, an inner peripheral face of the cylindrical portion 46 is faced to the cylindrical surface 42 formed on the nut 7 across the second small clearance 37b.

Also with this embodiment constructed as described above, the voltage induced in the coil 24 is changed by a similar interaction to that of the abovementioned sixth embodiment.

Figure 9:
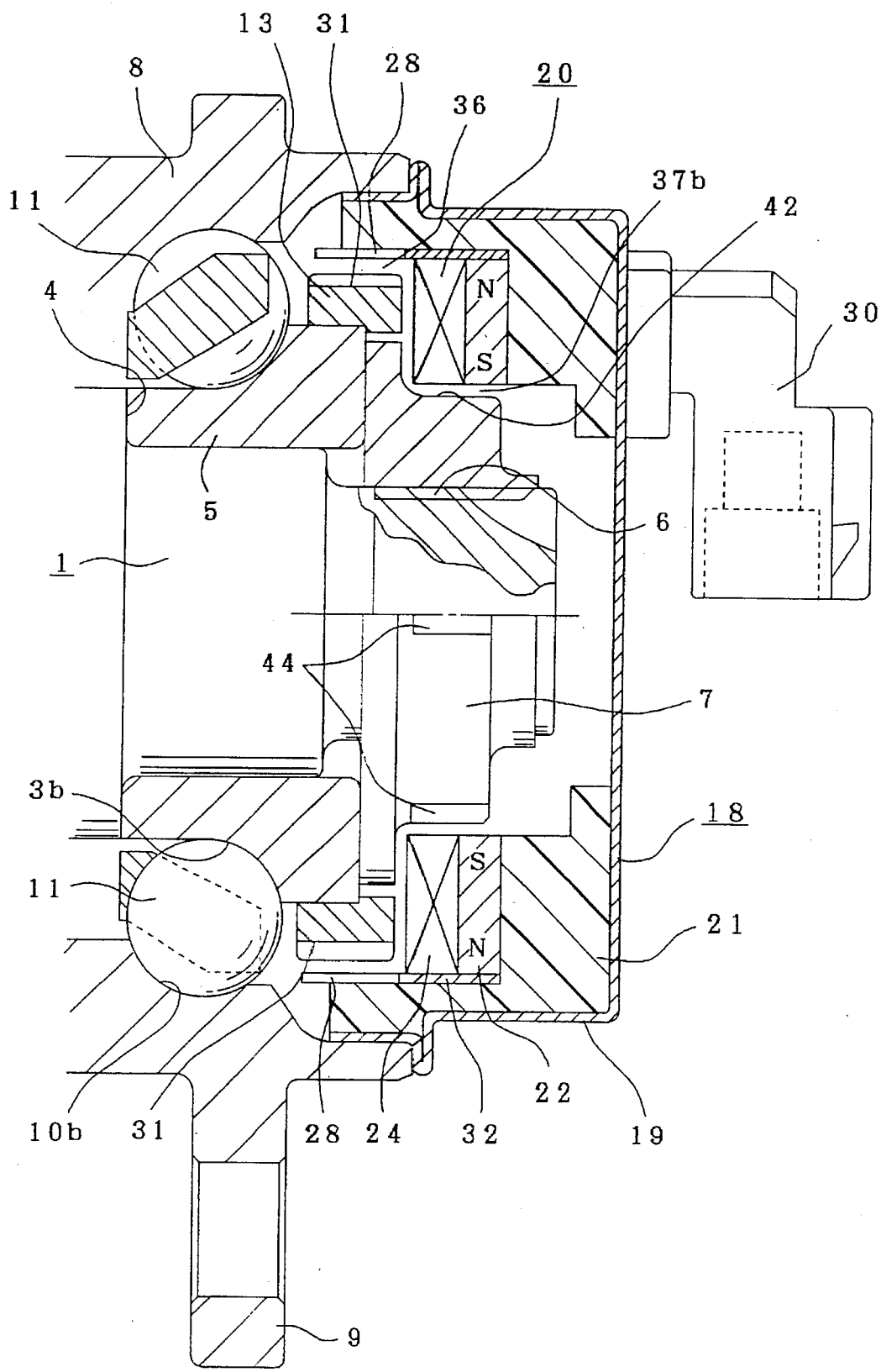
FIG. 9 is an enlarged view similar to FIG. 2 showing an eight embodiment of the present invention.

FIG. 9 shows an eighth embodiment of the present invention also according to the third aspect. With this embodiment, the permanent magnet 22 of a sensor 20 is a ring shaped and magnetized in the radial direction. Furthermore an inner peripheral face of the permanent magnet 22 is faced to the cylindrical surface 42 formed on the nut 7 across the second small clearance or clearance 37b.

Also with this embodiment constructed as described above, the voltage induced in the coil 24 is changed by a similar interaction to that of the abovementioned sixth and seventh embodiments.

Figure 10:
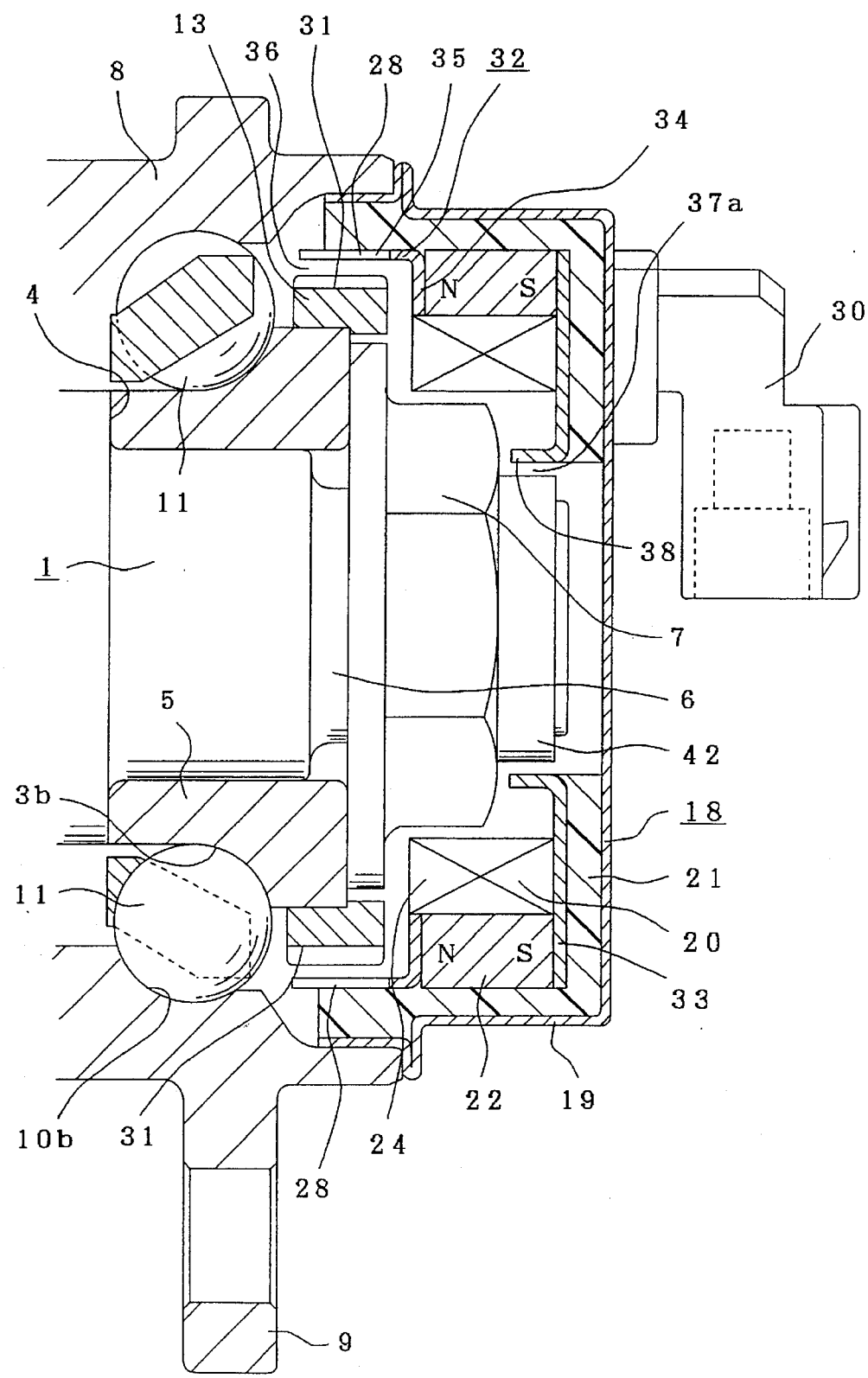
FIG. 10 is an enlarged view similar to FIG. 2 showing an ninth embodiment of the present invention.
Figure 11:
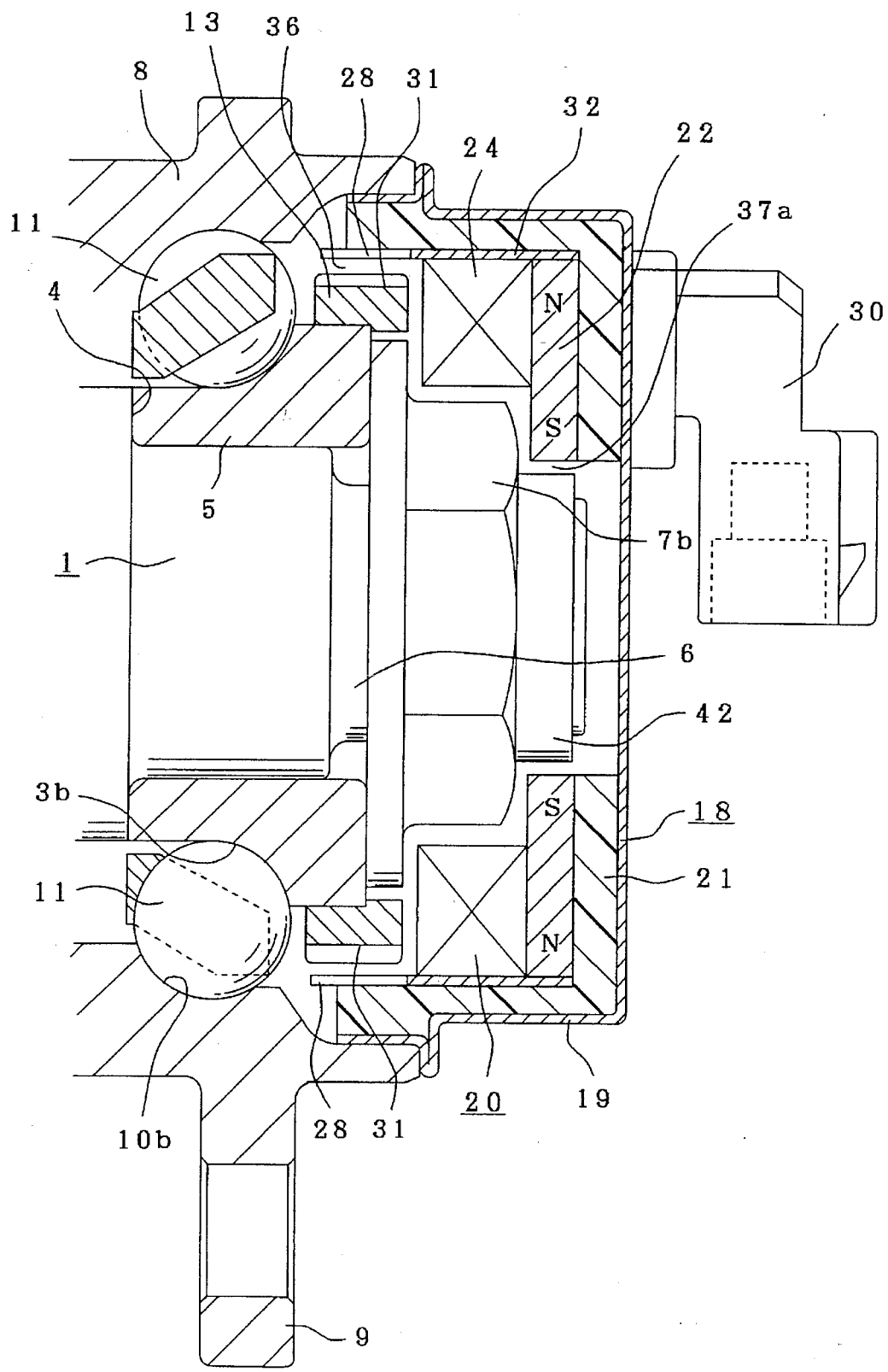
FIG. 11 is an enlarged view similar to FIG. 2 showing an tenth embodiment of the present invention.

FIGS. 10 and 11 show a ninth and tenth embodiment of the present invention also according to the third aspect. Both these embodiments resemble the respective third and fourth embodiments shown in FIGS. 4 and 5. However, with the third and fourth embodiments, the shaft portion 39 is formed on the axially inside end of the hub 1, and the cylindrical portion 38 of the second stator (FIG. 4) or the inner peripheral face of the permanent magnet 22 (FIG. 5) is faced to the outer peripheral face of the shaft portion 39 across the small clearance 37a, while with the ninth and tenth embodiments, a cylindrical face 42 is formed on the axially inner end of the nut 7, and the cylindrical portion 38 of the second stator 33 (FIG. 10) or the inner peripheral face of the permanent magnet 22 (FIG. 11) is faced to the cylindrical surface 42 across the small clearance 37a. The cross sectional shape of the coil 24 can be appropriately changed as required.

Although not shown in the figures, a rotational speed detection unit included within the technical scope of the present invention can be constructed by omitting the first stator 32 from the first and second embodiments shown in FIG. 1 through FIG. 3, and from the fifth, sixth, and ninth embodiments shown in FIG. 6, FIG. 7 and FIG. 10 respectively. In this case, the recess portions corresponding to the rotating cutout section can be formed on the axially inner end face of the tone wheel instead of on the outer peripheral face, and the recessed portion corresponding to the stationary cutout section can be formed on the axially outer end face of the permanent magnet.

Accordingly, recesses and protrusions in gear shape are formed on the axially inner end face of the tone wheel and on the axially outer end face of the permanent magnet, and the gear shaped end face of the tone wheel and the gear shaped end face of the permanent magnet are faced to each other in the thrust direction across a first small clearance.

Figure 12:
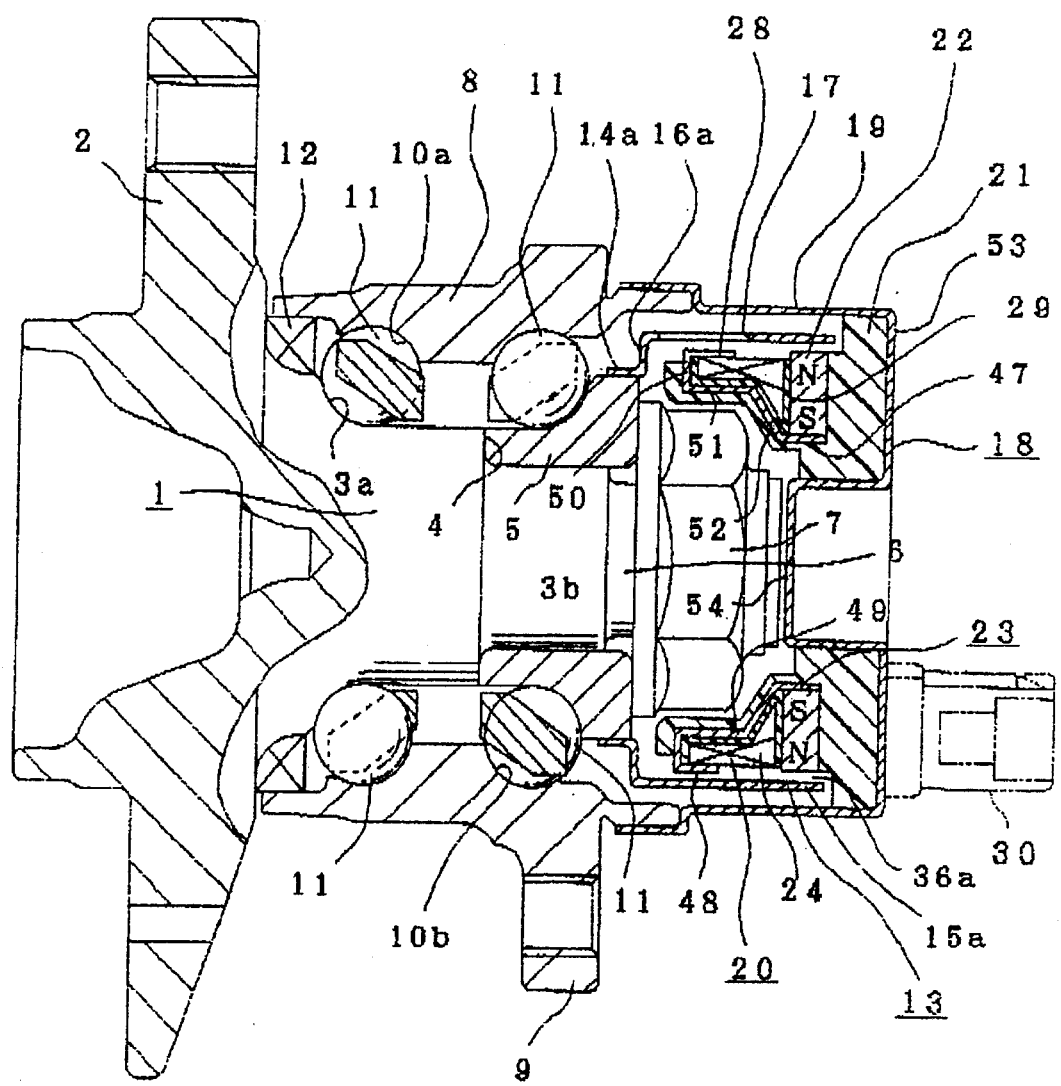
FIG. 12 is a cross sectional view showing an eleventh embodiment of the present invention.
Figure 13:
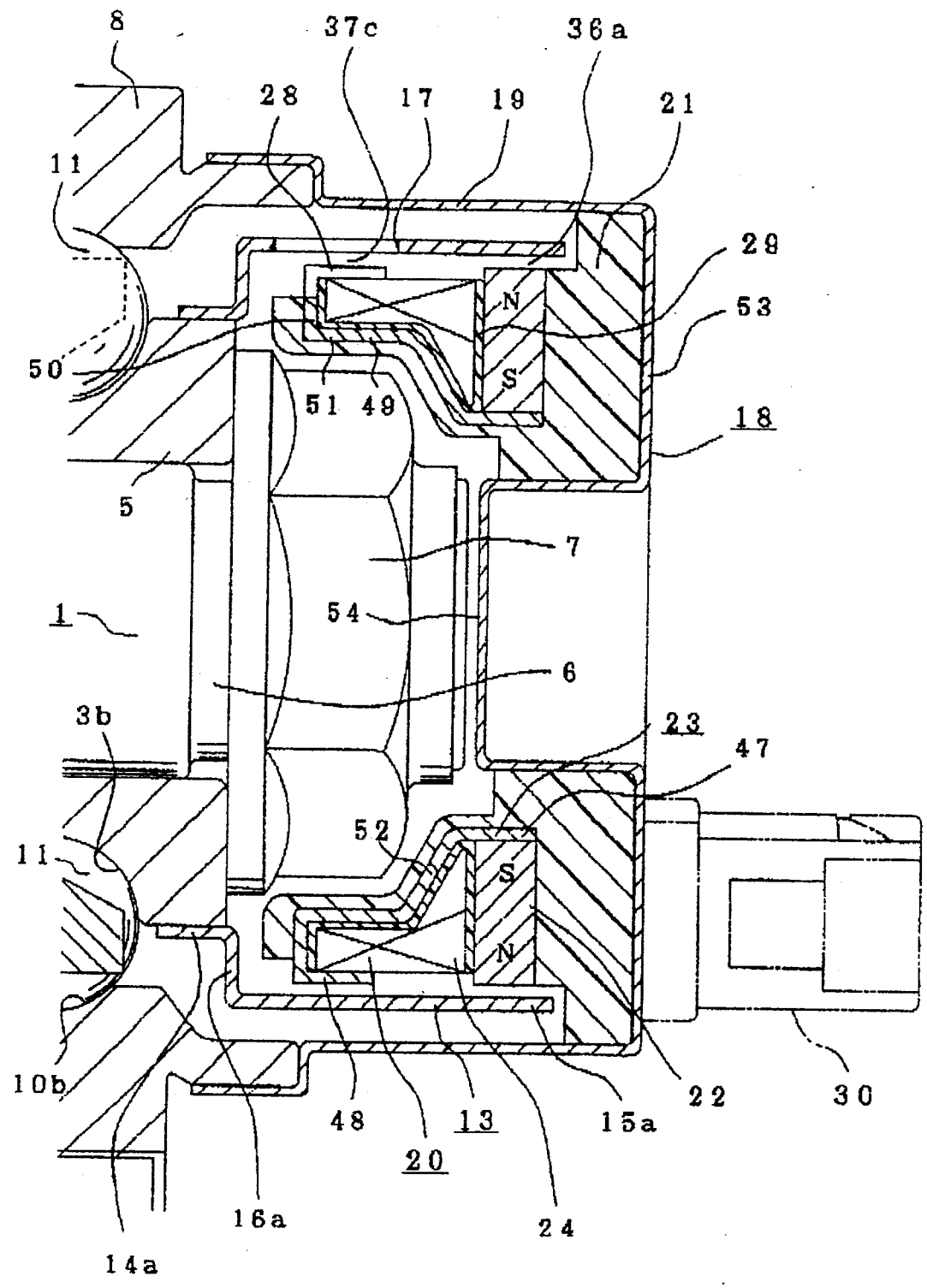
FIG. 13 is an enlarged view of the right hand portion of FIG. 12.

FIGS. 12 and 13 show an eleventh embodiment of the present invention corresponding to the fourth aspect. A tone wheel 13 which together with a sensor 20 constitutes the rotational speed detection unit, is formed in an overall cylindrical shape from a magnetic metal plate such as a steel plate, with an inner end rim of a smaller diameter portion 14a and an outer end rim of a larger diameter portion 15a connected by a step 16a giving a crank shape in cross section. Such a tone wheel 13 is fixed to the inner ring 5 by externally fitting the smaller diameter portion 14a to the axially inner end portion of the inner ring 5.

Moreover, with the tone wheel 13 fixed to the inner ring 5 in this manner, the larger diameter portion 15a is located around the periphery of the nut 7 which secures the inner ring 5.

A plurality of apertures 17 in the rotating cutout section which constitute a portion to be detected are formed on an axially outer half of the larger diameter portion 15a (left half in FIGS. 12 and 13) with an even spacing around the circumference.

Naturally, there are also magnetic material column portions circumferentially between adjacent pairs of aperture 17. It will suffice however if the rotating cutout section is provided at least on the inner peripheral face of the larger diameter portion 15a. Specifically, recesses can be formed instead of the apertures or through-holes. Accordingly, recesses and protrusions in an inner gear shape can be formed on the inner peripheral face of the larger diameter portion 15a, so that the recesses form the rotating cutout section.

The sensor 20 comprises a permanent magnet 22, a stator 23, and a coil 24. The permanent magnet 22 is formed as an overall ring shape (annular shape), magnetized in the radial direction. The magnetized direction does not change around the whole circumference. An outer peripheral face which constitutes one end face in magnetized direction of the permanent magnet 22 is faced to an inner peripheral face of a portion on the axially inner end portion (right end portion in FIGS. 12 and 13) of the larger diameter portion 15a of the tone wheel 13 in which the apertures 17 are not formed, across a first small clearance 36a. The inner end portion is "the one part of the tone wheel".

An outer peripheral face of an axially inner end portion of the stator 23 formed in an annular shape from a magnetic metal plate in a similar manner to the tone wheel 13, is abutted against or located close to an inner peripheral face (the other end face in magnetized direction) of the permanent magnet 22. The stator 23 comprises an inside cylindrical portion 47, an outside cylindrical portion 48 and a connecting portion 49 connecting the two cylindrical portions 47, 48.

Of these, the outer peripheral face of the inside cylindrical portion 47 which constitutes the axially inner end portion of the stator 23 is abutted against or located close to the inner peripheral face of the permanent magnet 22. That is to say the inside cylindrical portion 47 which constitutes the inner end portion, is "the one end portion of the stator".

The outer peripheral face of the outside cylindrical portion 48 (the other end portion) of the stator 23, is faced to an inner peripheral face of a portion on the outer half of the larger diameter portion 15a of the tone wheel 13 with the apertures 17, across a second small clearance 37c. This portion is "the other part of the tone wheel".

A plurality of cut-outs 28 in the stationary cutout section are formed in the outside cylindrical portion 48 at the same pitch as the apertures 17. Accordingly, tongues of magnetic material are provided at the same pitch as the columns (as well as that of the apertures 17 and cut-outs 28) circumferentially between adjacent pairs of cut-outs 28.

The connecting portion 49 is comprised of a ring portion 50 which is bent radially inwards (up/down direction in FIGS. 12 and 13) from the outer end rim of the outside cylindrical portion 48, a cylindrical portion 51 which is bent axially inwards (right direction in FIGS. 12 and 13) from the inner peripheral rim of the ring portion 50, and an inclined portion 52 which connects the inner end rim (right end rim in FIGS. 12 and 13) of the cylindrical portion 51 to the outer end rim (left end rim in FIGS. 12 and 13) of the inside cylindrical portion 47. The cylindrical portion 51 located around the periphery of the nut 7, has an inner diameter slightly larger than the outer diameter of the nut 7 to avoid interference with the nut 7. The inside cylindrical portion 47 which is away from the nut 7 in the axial direction, has an inner diameter which is sufficiently smaller than the outer diameter of the nut 7.

The coil 24 is provided in the region defined in three directions by the stator 23 and the axially outer face of the permanent magnet 22. The coil 24 is made by winding wire onto a bobbin 29 being open on the outer peripheral side and made in annular shape from a synthetic resin. The two ends of the wire are connected to terminals of a connector 30 which protrudes outwards from a cover 18 to be described next. In order to simplify winding wire onto the bobbin 29, the cross section shape of the bobbin 29 may made a channel shape and open on the outer peripheral side, so that the cross section shape of the coil 24 becomes a square or rectangular shape.

The sensor 20 formed in an overall annular shape from the permanent magnet 22, the stator 23 and the coil 24, is embedded in a synthetic resin 21 also formed into an annular shape, and thereby fixedly engaged inside a cover 18. The cover 18 is constructed in the form of a bottomed cylinder by press forming or drawing a metal plate such as a stainless steel plate, and is fixed to the outer ring 8 by externally fitting its open end portion onto an axially inner end portion of the outer ring 8, thereby covering the axially inner end opening of the outer ring 8. A bottomed cylindrical protrusion 54 is formed on a diametrically central portion of a bottom plate 53 of the cover 18. The synthetic resin 21 is engagedly fixed in an annular space between an outer peripheral face of the protrusion 54 and an inner peripheral face of the cylindrical portion 19. Accordingly, the support strength of the synthetic resin 21 can be adequately maintained thus ensuring the durability of the synthetic resin 21 irrespective of moment loads applied thereto due for example to vibration during running.

With the speed sensing rolling bearing unit according to the present invention constructed as described above, the larger diameter portion 15a formed with the apertures 17 in the tone wheel 13 can be made larger in diameter. Consequently, the circumferential speed of the portion formed with the apertures 17 can be increased and the pitch of the apertures 17 increased.

Moreover, since the sensor 20 is located radially inside the larger diameter portion 15a, then the diameter of the coil 24 of the sensor 20 is not increased. As a result, the number of windings of wire can be increased without an increase in the overall length of the wire of the coil 24, so that an output increase of the sensor 20 is achieved.

Furthermore, the inner diameter of the coil 24 of the sensor 20 is increased at the portion opposite to the outer peripheral face of the nut 7, and reduced at the portion axially displaced inward from the outer peripheral face of the nut 7, thus effectively utilizing the air space. As a result, the number of windings can be sufficiently increased to obtain a sufficiently large increase in output.

As a variation example of this embodiment, an inner peripheral face of a second stator (not shown in the figure) may be abutted against or provided close to the outer peripheral face of the permanent magnet 22, with an outer peripheral face of the second stator faced to the inner peripheral face of the larger diameter portion 15a across the first small clearance 36a of the tone wheel 13.

Figure 14:
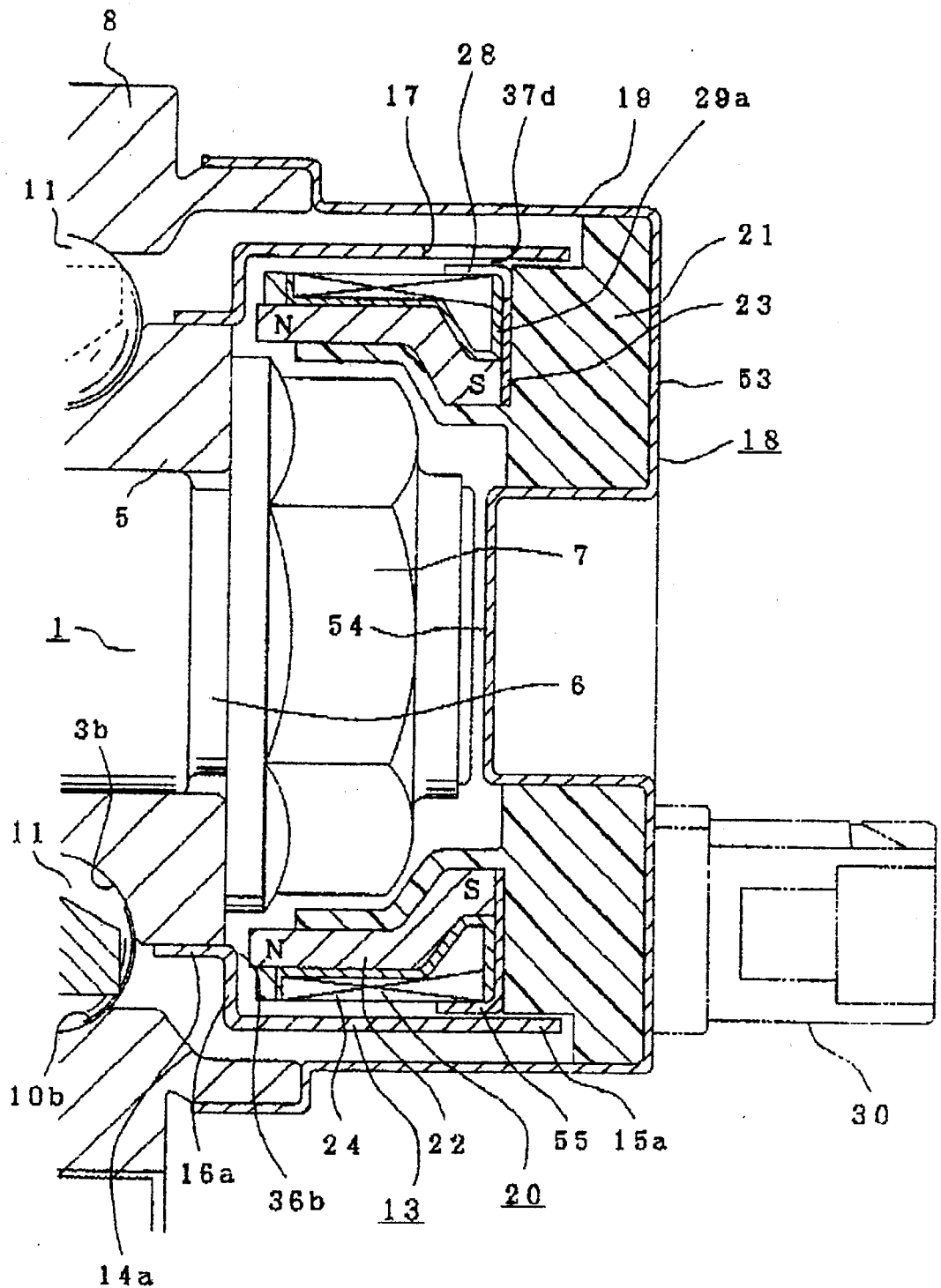
FIG. 14 is an enlarged view similar to FIG. 2 showing an twelfth embodiment of the present invention.

FIG. 14 shows a twelfth embodiment of the present invention. With this embodiment, by magnetizing the permanent magnet 22 of the sensor 20 in the axial direction (left/right direction in FIG. 14) and reducing the diameter of the axially inner end portion of the permanent magnet 22 (right end portion in FIG. 14), then the inner diameter of the sensor 20 can be reduced at the portion axially inwards from the nut 7.

The stator 23 is formed in an overall annular shape of L shape in cross section, from a magnetic metal plate. Moreover, the axially outer end face of the permanent magnet 22 (left end face in FIG. 14) is faced to the axially inner end face (right end face in FIG. 14) of the step portion 16a of the tone wheel 13 and to the axially inner end face (right end face in FIG. 14) of the inner ring 5 of magnetic material, across the first small clearance 36b. That is to say, the axially outer end face of the permanent magnet 22 is "the one end face in magnetized direction of the permanent magnet", while the axially inside face of the step 16a of the tone wheel 13 and the inner end face of the inner ring 5 are "the one part of the tone wheel".

Moreover, the radially inner (up/down direction in FIG. 14) end portion of the stator 23 is abutted against the axially inner end face (right end face in FIG. 14) of the permanent magnet 22. This inner end portion is "one end portion of the stator", while the axially inner end face of the permanent magnet is "the other end face" in magnetized direction.

A cylindrical portion 55 forming an outer peripheral face of the stator 23 is faced to the inner peripheral face of the axially inner half (right half of FIG. 14) of the larger diameter portion 15a of the tone wheel 13 across a second small clearance 37d.

The cylindrical portion 55 is "the other end of the strator", while the inner half of the larger diameter portion 15a is the other part of the tone wheel.

The apertures 17 in the rotating cutout section to be detected, are formed on the axially inner half of the larger diameter portion 15a of the tone wheel 13, while the cut-outs 28 constituting the stationary cutout section are formed on the cylindrical portion 55.

With this embodiment also the space is effectively utilized in a substantially similar manner to that of the eleventh embodiment, so that a sufficient increase in the number of windings, and a sufficiently large increase in output can be obtained. With this embodiment, the axially outer end of the permanent magnet 22 of the sensor 20 is exposed from the synthetic resin 21. However since the bent portion of the permanent magnet 22 is embedded in the synthetic resin 21, the permanent magnet 22 cannot move relative to the synthetic resin 21.

As a variation example of this embodiment, the permanent magnet 22 may be made in a simple cylindrical shape so as to be easily manufactured, and disposed at a location away from the outer periphery of the hexagonal portion of the nut 7, with an axially inner end face of a second stator (not shown) abutted against the axially outer end face of the permanent magnet, such that an axially outer end face of the second stator is faced to the axially inner face of the step 16a and the axially inner end face of the magnetic inner ring 5 or to the inner peripheral face of the larger diameter portion 15a of the tone wheel 13, across a first small clearance or gap 36b. In this case, the second stator is "the portion magnetically connected to the one end face in magnetized direction of the permanent magnet".

Figure 15:
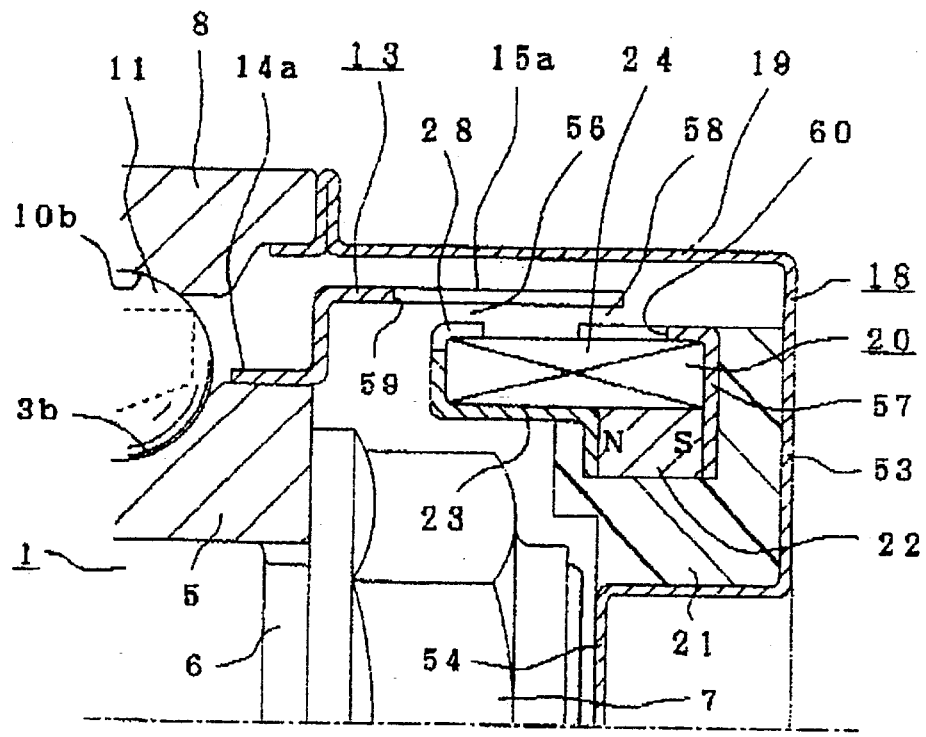
FIG. 15 is an enlarged view of a portion corresponding to the upper half of FIG. 2, showing an thirteenth embodiment of the present invention.

FIG. 15 shows a thirteenth embodiment of the present invention also according to the fourth aspect. With this embodiment, a sensor 20 includes an annular permanent magnet 22 magnetized in the axial direction (left/right direction in FIG. 15). A base end of a stator 23 (right end in FIG. 15) is abutted against an axially outer end face (left end face in FIG. 15) of the permanent magnet 22, and an outer peripheral face of a tip end portion (left edge in FIG. 15) of the stator 23 is faced to a central inner peripheral face of the larger diameter portion 15a of the tone wheel 13 across a small clearance 56.

A second stator 57 formed in an L shape in cross section has a base end (designating "the diametrically inner peripheral end portion"; lower end in FIG. 15) which is abutted against the axially inner end face (right end face in FIG. 15) of the permanent magnet 22, and an outer peripheral face of a tip end portion of the second stator 57 (designating the axially outer end portion of the cylindrical portion provided on the diametrically outer peripheral rim, left end portion in FIG. 15) is faced to the inner peripheral face of the axially inner end portion (right end portion in FIG. 15) of the larger diameter portion 15a across a small clearance 58.

The inner half (right half in FIG. 15) of the larger diameter portion 15a is formed as comb like teeth by forming cut-outs 59 in the rotating cutout section, and the tip end portion of the stator 23, and the tip end portion of the second stator 57 in the stationary cutout sections are formed as comb like teeth by forming cut-outs 28, 60, respectively. Of course, the pitches of the respective cut-outs 59, 28 and 60 are all equal to each other. Moreover, the phases of the cut-outs 28, 60 are all the same.

A coil 24 is nested in the region enclosed by the permanent magnet 22, the stator 23, and the second stator 57. Due to the change in density of the flux flowing in the permanent magnet 22, stator 23, and second stator 57, a voltage is induced which changes at a frequency proportional to the rotational speed of the tone wheel 13.

If the axially outer end face of the permanent magnet 22 is taken as the "one end face in magnetized direction", then the "one part of the tone wheel" is the inner peripheral face of the central portion of the larger diameter portion 15a, while the "other part" is the axially inner end portion of the larger diameter portion 15a.

In this case, the "stator" as disclosed in the fourth aspect, is the second stator 57, and the base end portion of the second stator 57 is the "one end portion of the stator", while the tip end portion of the second stator 57 is the "other end portion of the stator".

Furthermore, the stator 23 forms the portion magnetically connected to the one end face in magnetized direction. In this case, the small clearance 56 corresponds to the "first small clearance", while the small clearance 58 corresponds to the "second small clearance".

On the other hand, if the one end face in magnetized direction is made the axially inner end face of the permanent magnet 22, then the "one part" of the tone wheel and the "other part" of the tone wheel are respectively the axially inner end portion and the central portion of the larger diameter portion 15a.

Furthermore, the stator 23 is the "stator" disclosed in the fourth aspect, and the base end portion thereof is the "one end portion of the stator", and the tip end portion thereof is the "other end portion of the stator". The second stator 57 in this case is the part which is magnetically connected to the one end face in magnetized direction. Moreover, the small clearance 56 is the "second small clearance", while the small clearance 58 becomes the "first small clearance".

With this embodiment constructed as described above, the resistance to the flow of flux changes with rotation of the tone wheel 13 changes, at the part where the tip end portion of the stator 23 is opposed to the larger diameter portion 15a, and also simultaneously at the part where the tip end portion of the second stator 57 is opposed to the larger diameter portion 15a. Accordingly the change in flux density with rotation of the tone wheel 13 is enlarged enabling an increase in the output of the sensor 20.

When the plate thickness of the tone wheel 13 cannot be made sufficient to prevent deformation due to centrifugal forces, so that the axially inner end portion of the larger diameter portion 15a can not be prevented from being deformed, then apertures similar to those of the beforementioned respective embodiments can be adopted for the rotating cutout section. In this case, depending on the fact that the apertures are formed in either the axially inner end portion or the central portion of the larger diameter portion 15a, then the cut-outs 28 (60) are not formed in one or other of the tip end portions of the stator 23 and the second stator 57. With such a construction, the stator 23 (57) in which the cut-outs 28 (60) are formed corresponds to the "stator" disclosed in the fourth aspect.

Now, although omitted from the figures, with the eleventh to thirteenth embodiments, through-holes are formed in one part of the bottom plate 53 of the cover 18, and the two ends of the wire of the coils 24 are connected to terminals of the connector 30 through these through-holes.

The through-holes may be formed by various known processes. A short cylindrical shape is possible for the through-hole instead of a simple opening provided in the one part of the bottom plate 53. In the through-hole is formed in the bottom plate 53 by a burring process for example, this will result in a cylindrical shape. In the case of a through hole in a short cylinder shape, the support strength of the sensor 20 can be improved.

Figure 20:
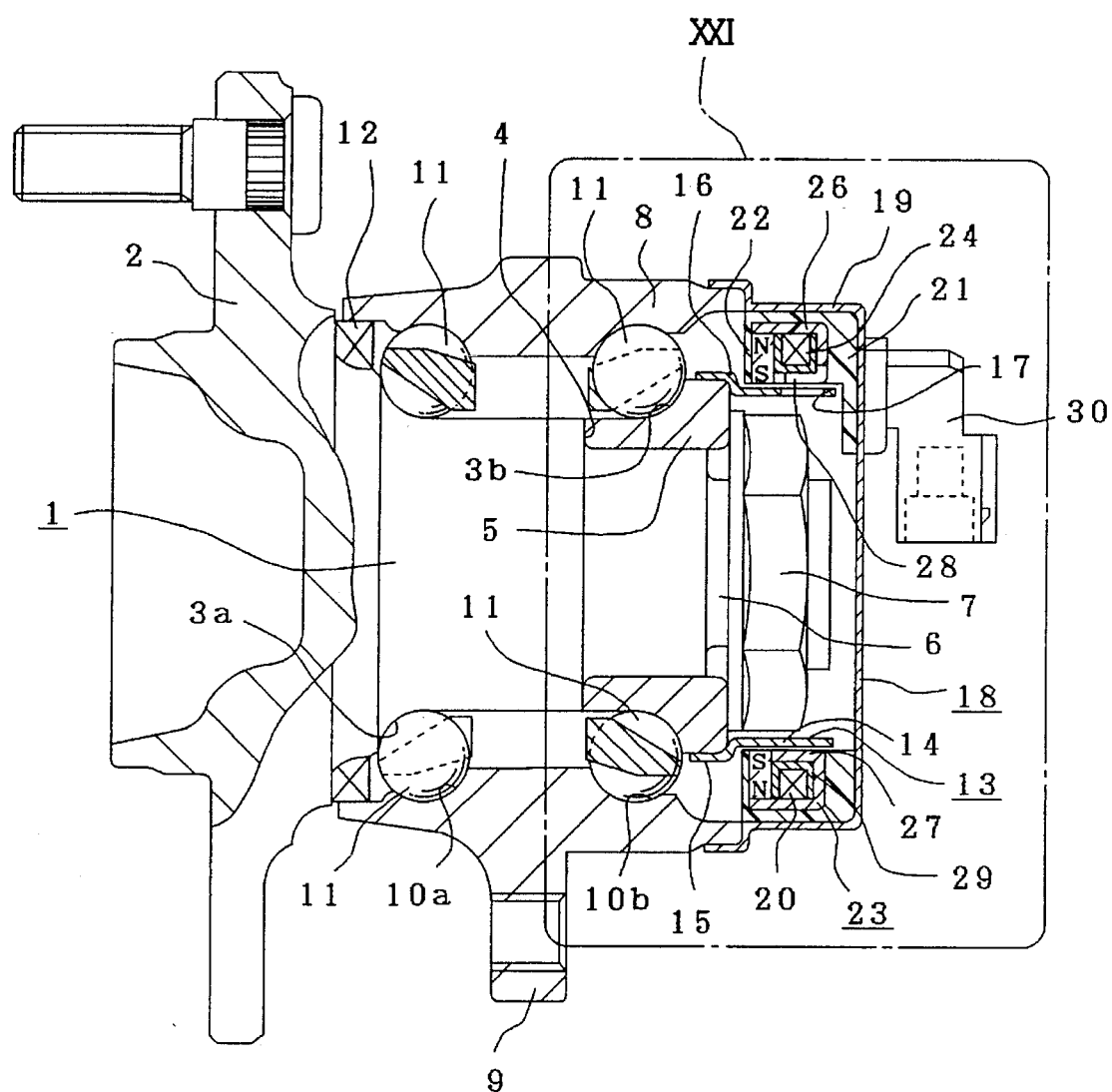
FIG. 20 is a cross sectional view of an example of a conventional construction.
Figure 21:
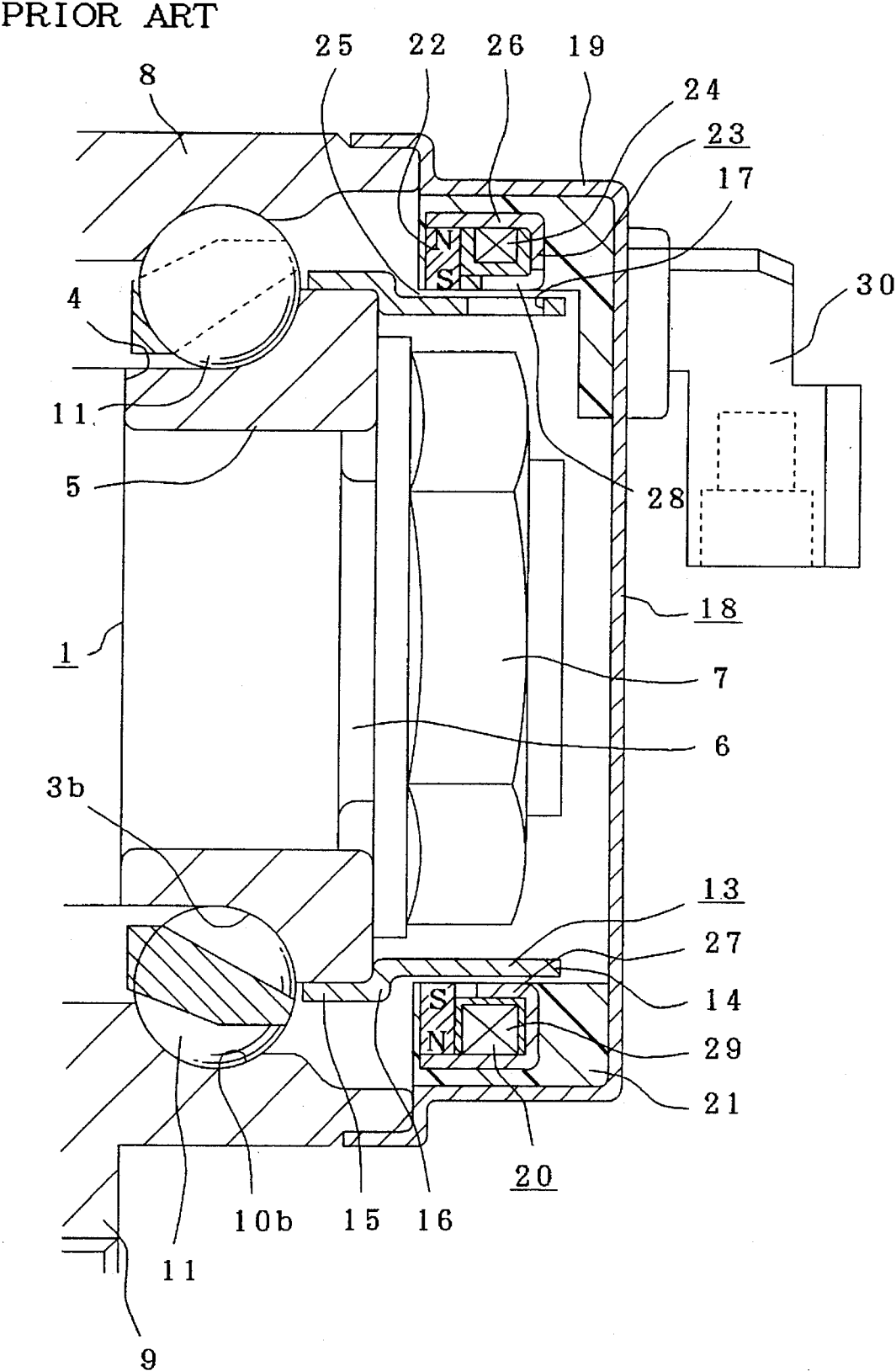
FIG. 21 is an enlarged view of part XXI of FIG. 20.

With the beforementioned respective embodiments, the example is given where a protrusion 54 is formed in a central portion of the bottom plate 53. However a construction is also possible, as with the conventional examples shown in FIGS. 20 and 21, wherein such a protrusion 54 is not formed.

Incidentally, it is possible to use a generally disk-shaped permanent magnet 22 and a generally disk-shaped stator 23, 57 so as to increase the magnetic flux amount from the permanent magnet. Therefore, the present embodiment is not limited to the annular permanent magnet 22, and the annular stator 23, 57.

With the eleventh to thirteenth embodiments shown in FIGS. 12 to 15, the construction is such that the portion at the one part of the strator which is faced to the inner peripheral face of the tone wheel, is not covered by the synthetic resin. When this structure is adopted, then the thickness of the small clearance 56 between the inner peripheral face of the tone wheel and the stator can be reduced by the thickness of the synthetic resin covering the surface of the sensor, thus enabling a sensor output increase. Moreover since the strator is not covered by the synthetic resin, the thickness of the small clearance between the tone wheel and the stator which are respectively made of steel will not change appreciably with changes in the surrounding temperature. Accordingly, there will be minimal change in the magnitude of the output voltage from the sensor due to the surrounding temperature.

Figure 16:
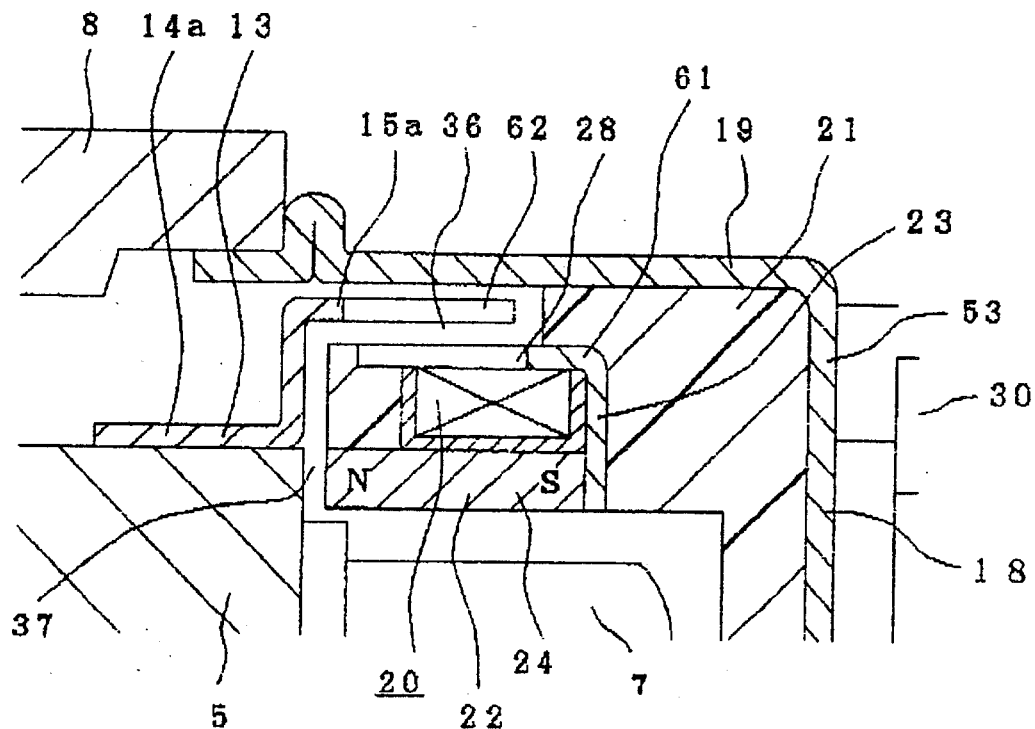
FIG. 16 is an enlarged view similar to FIG. 15 showing an fourteenth embodiment of the present invention.

FIG. 16 shows a fourteenth embodiment of the present invention also according to the fourth aspect. With this embodiment, cut-outs 28 are formed at a portion near a tip end portion of a cylindrical portion 61 of a stator 23, in a portion facing the cut-outs 62 formed in the tone wheel 13. The number and pitch around the circumference of the cutouts 28 are the same as those of the cut-outs 62.

The inner peripheral face of the larger diameter portion 15a of the tone wheel 13 is faced to an outer peripheral face of the cylindrical portion 61 across a first small clearance 36.

The axially inner end face (right end face in FIG. 16) of the axially magnetized permanent magnet 22 is abutted against the stator 23, while the axially outer end face (left end face in FIG. 16) is faced to the axially inner end face of the inner ring 5 of magnetic material to which the tone wheel 13 is externally fitted, across the second small clearance 37.

With this embodiment also, since the sensor components can be assembled together by effectively using the limited space, then a speed sensing rolling bearing unit of a small size with a sufficiently large output of the sensor 20 becomes possible. Moreover, since the diameter of the tone wheel 13 can be increased without increasing the diameter of the coil 24 of the sensor 20, the output of the sensor 20 can be increased.

Figure 17:
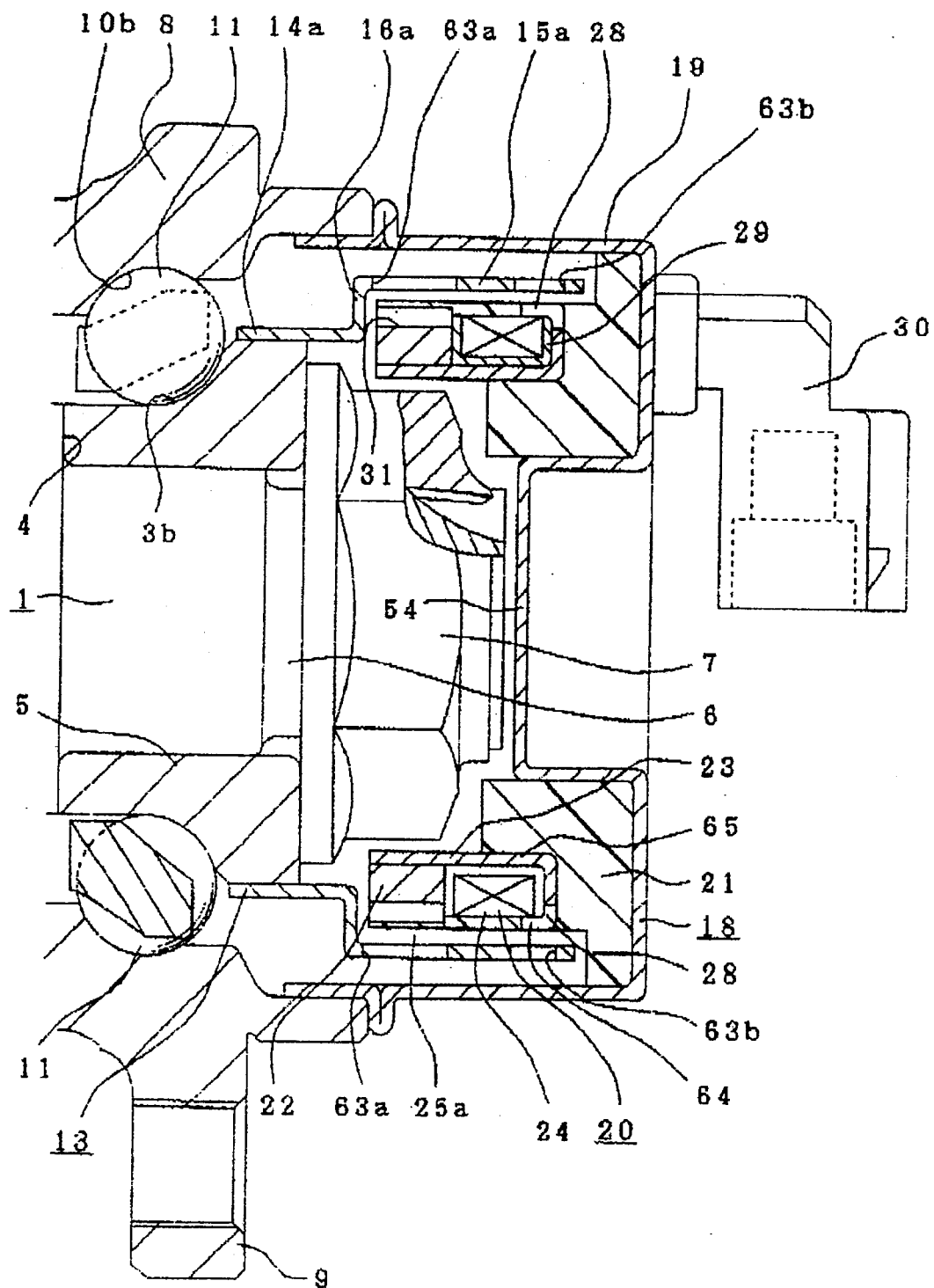
FIG. 17 is an enlarged view similar to FIG. 2 showing an fifteenth embodiment of the present invention.

FIG. 17 shows a fifteenth embodiment of the present invention, also according to the fourth aspect. With this embodiment, a plurality of apertures 63a, 63b in the rotating cutout section are respectively formed in the larger diameter portion 15a of a tone wheel 13, at even spacing around the circumferential direction. A sensor 20 incorporates a permanent magnet 22, a stator 23 and a coil 24 which are respectively an annularly shaped. The permanent magnet 22 is magnetized in the radial direction around the whole circumference. Gear shaped recesses/protrusions are formed on an outer peripheral face (one end face in magnetized direction) of the permanent magnet 22. Moreover, this outer peripheral face is faced across a small clearance 25a to the portion on one part of the inner peripheral face of the larger diameter portion 15a, which is formed with apertures 63a.

The stator 23 is formed from a magnetic metal plate such as low carbon steel plate formed into a substantially J shape in cross section, with an outer cylindrical portion 64 and an inner cylindrical portion 65 coaxial with each other. If the stator 23 is made from electromagnet steel or magnetic pole steel with a high saturation flux density, then the plate thickness of the stator 23 can be made thinner as well as preventing and saturation of the flux in the stator 23.

With the two cylindrical portions 64, 65 the tip end of the inner cylindrical portion 65 protrudes axially outwards further than the tip end of the outer cylindrical portion 64. Furthermore, at a tip end portion of the inner cylindrical portion 65, an inner peripheral face of a permanent magnet 22 is abutted against or arranged close to an outer peripheral face of the part protruding axially outwards from the tip end of the outer cylindrical portion 64.

The outer cylindrical portion 64 formed on the other end of the stator 23, is formed with cut-outs 28 in the stationary cutout section with the same pitch as that of the apertures 63b. The outer cylindrical portion 64 formed with the cut-outs 28, is faced to the portion formed with apertures 63b in the larger diameter portion 15a of the tone wheel 13, across a small clearance 25a. Furthermore, the coil 24 is disposed around the whole circumference in a central portion of the stator 23 in a region enclosed by a side face of the permanent magnet 22, the outer cylindrical portion 64, and the inner cylindrical portion 65.

The sensor 20 constructed as described above, is embedded in a synthetic resin 21 which is made in an overall annular shape with a central projection in cross section, and which is fixed inside the cover 18, which is in turn fitted to the axially inner end opening portion of the outer ring 8. In this condition, the inner peripheral face of the larger diameter portion 15a of the tone wheel 13 is faced to the outer peripheral face of the sensor 20 supported in the synthetic resin 21, across a small clearance 25a.

With the speed sensing rolling bearing unit of the present invention constructed as described above, when the tone wheel 13 rotates with the hub 1, the flux density inside the stator 23 faced to the tone wheel 13 changes, so that a voltage induced in the coil 24 changes at a frequency proportional to the rotational speed of the hub 1.

With this embodiment also, since the inner peripheral face of the larger diameter portion 15a formed on the tone wheel 13 is faced to the outer peripheral face of the outer cylindrical portion 64 formed on the stator 23, then the diameters of the larger diameter portion 15a and the cylindrical portion 64 can be increased.

That is to say, since the outer cylindrical portion 64 is located on the outer peripheral side of the sensor 20, the radial thickness of which may be increased to some extent by for example the presence of the coil 24, the diameter of the larger diameter portion 15a and the cylindrical portion 64 can be increased. As a result, the number of apertures 63a, 63b in the rotating cutout section and cut-outs 28 in the stationary cutout section can be sufficiently maintained, so that the rotational speed detection accuracy can be increased.

Moreover, the width of the column portions between the adjacent pairs of aperture pairs 63a (63b pairs), and the width of the tongue portions between the ad3a cent pairs of cut-out pairs 28, can be adequately maintained. In addition, the speed of the portion formed with the apertures 63a, 63b in the tone wheel 13, can be increased, so that sensor output can be increased.

When as with the respective embodiments, the magnetized direction of the permanent magnet in the sensor does not change around the whole circumference, then compared to constructions wherein it does change, the rotational speed detection accuracy can be improved. Also the permanent magnet construction can be simplified and the cost of parts reduced.

The theory related to the improvement in rotational speed detection accuracy with the construction wherein the magnetized direction of the permanent magnet does not change around the circumference, will now be explained. In the case wherein south and north poles are arranged alternately around the circumference, it is necessary to minimize the flux flowing directly between the adjacent south and north poles (ie. not via the tone wheels). For example, when the ratio between the pitch in the circumferential direction of the alternately repeating south and north poles, and the thickness T of the small clearance between the end face in magnetized direction of the permanent magnet and the tone wheel (ie. P/T) is small, then the proportion of flux flowing directly from the north poles to the adjacent south poles is large.

Figure 18:
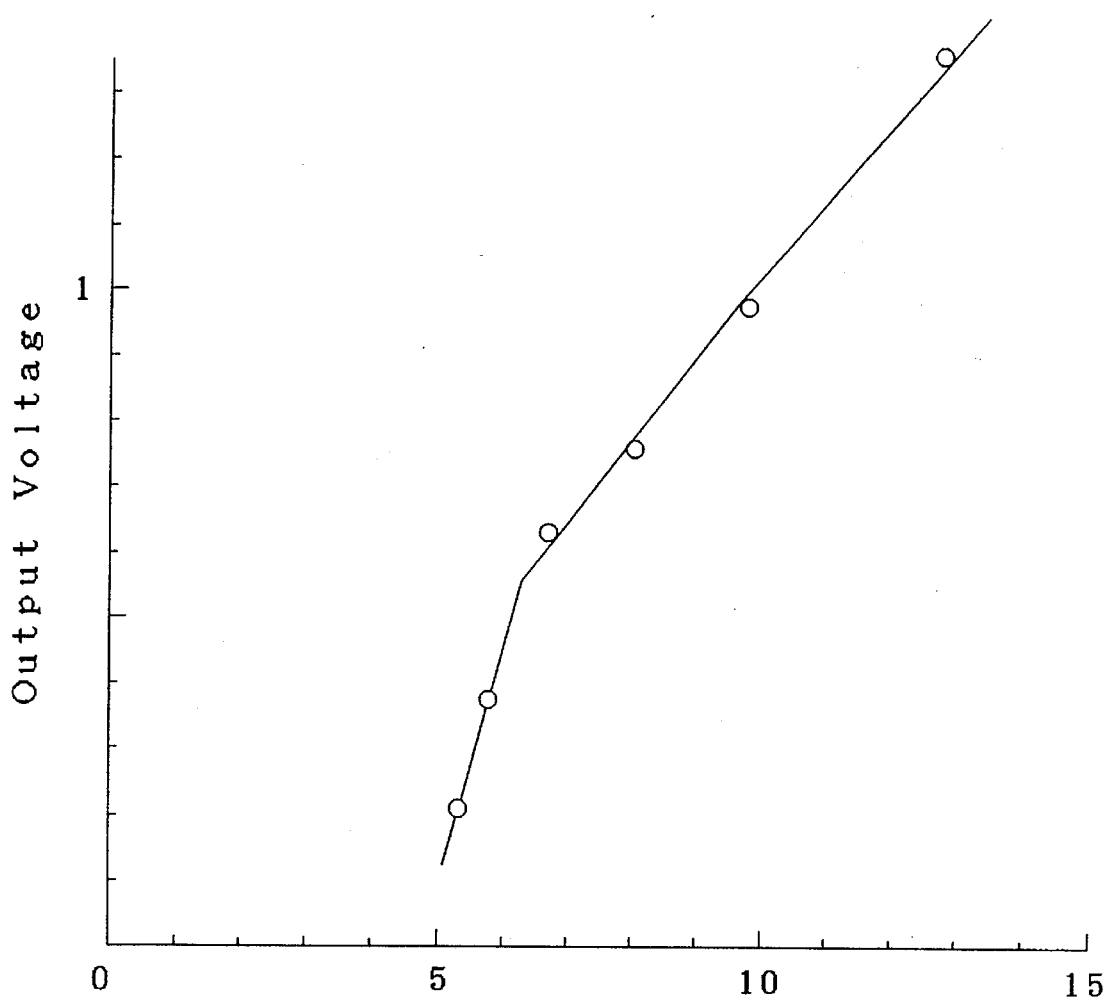
FIG. 18 is a graph showing a relationship between the ratio of the pitch of the magnetic poles and the cutouts to the thickness of the small clearance and the output of the sensor in a rolling bearing unit fitted with a permanent magnet with north and south poles arranged alternately.

FIG. 18 shows the results of an experiment carried out by the inventor with a construction using a permanent magnet with the magnetized direction changing around the circumference, to understand the influence that the abovementioned ratio (P/T) exerts on the output voltage of the sensor. FIG. 18 shows the size of the sensor output when the ratio (P/T) is changed, with the sensor output voltage being 1.0 when the ratio (P/T) is 10. As is apparent from FIG. 18, there is a sharp drop in output voltage in the region of (P/T) of 6.5.

On the other hand, it is necessary for the thickness T of the small clearance between the end face in magnetized direction of the permanent magnet, and the tone wheel to be at least 0.6 mm. This is to ensure that there is no contact between the sensor and the tone wheel even with elastic deformation and the like of the components when the bearing unit rotates. Accordingly, the pitch P (=the pitch of the cut-outs formed in the tone wheel) of the alternately repeating S poles and N poles at the end face in magnetized direction of the permanent magnet must be kept greater than 0.6 mm×6.5=3.9 mm to obtain a sufficient output. On the other hand if the pitch P is too large (greater than 3.9 mm), then a larger number of S poles and N poles around the circumference and cut-outs in the tone wheel is not possible. If a larger number of S poles and N poles and cut-outs is not possible, then there will be fewer changes in the output per revolution (a longer output change period), so that accurate determination of the rotation speed at low speeds is not possible. In other words, the rotational speed detection accuracy drops.

In contrast to this, with the construction wherein the magnetized direction of the permanent magnet does not change around the circumference, most of the magnetic flux flows thorough the tone wheel even if the pitch of the cutouts in the rotating and stationary cutout sections is less than 3.9 mm. As a result, instead of the characteristics shown in FIG. 18, there is no sudden drop in the output even if the pitch of the cutouts is less than 3.9 mm. Accordingly, the pitch of the cutouts can be reduced, enabling rotational speed detection accuracy to be improved.

With the beforementioned respective embodiments, to ensure accurate rotational speed detection, it is desirable that the maximum density of the magnetic flux (maximum magnetic flux density) output from the end face in magnetized direction of the permanent magnet, and flowing in the stator and tone wheel, is more than 1000 Gauss. The reason for this is as follows.

The sensor of the rotational speed detection unit fitted into the bearing unit, is continuously exposed to external magnetic fields, and residual magnetism in the components of the bearing unit.

Therefore to accurately determine the rotational speed, it is necessary that the effect of the external magnetic field and residual magnetism is kept to an insignificant level.

On one hand, the error difference in the pitch of the cut-outs formed in the rotating and stationary cutout sections is kept to around 1–2%. Accordingly, to ensure accurate rotational speed detection, it is desirable to keep the influence of the external magnetic field and residual magnetism within 1–2%.

On the other hand, there is normally a residual magnetism of around 10 Gauss in the inner ring and outer ring of the bearing unit. Therefore, to keep the influence of the residual magnetism to within 1%, it is desirable that the maximum magnetic flux density is more than 1000 Gauss.

With the construction wherein the magnetized direction of the permanent magnet does not change around the circumference, no particular problem arise when the maximum magnetic flux density is more than 1000 Gauss. In contrast to this, with the construction wherein the N pole and S pole are alternately arranged around the circumference, since the proportion of the flux flowing directly from the N poles to the adjacent S poles becomes high as the maximum magnetic flux density becomes high, so that the sensor output does not increase even if the maximum magnetic flux density is more than 1000 Gauss.

Therefore from this perspective also, to accurately detect the rotational speed, the construction wherein the magnetized direction of the permanent magnet does not change around the circumference is preferable.

With the construction of the present invention using an annular sensor, with the peripheral face of the sensor faced to the peripheral face of the tone wheel around the whole circumference, the output of the sensor is stable irrespective of any displacement of the sensor relative to the tone wheel.

Figure 19:
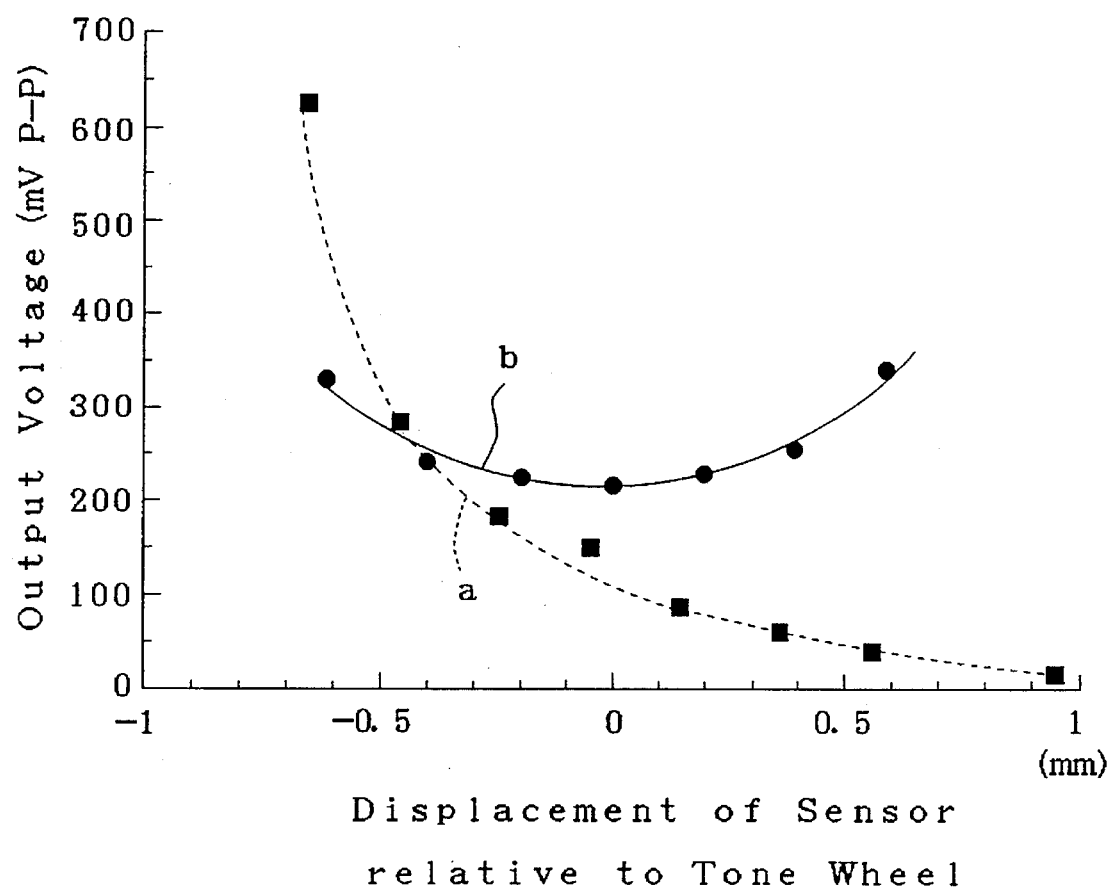
FIG. 19 is a graph showing the influence that the diametric displacement of the sensor exerts on the output of the sensor.

More specifically, with the conventional construction wherein the sensor is faced to the tone wheel at only one part around the circumference of the tone wheel, the output of the sensor changes with displacement of the sensor relative to the tone wheel as shown by the broken line "a" in FIG. 19. On the other hand, with the construction using the annular shaped sensor, the output of the sensor changes with displacement of the sensor relative to the tone wheel as shown by the full line "b" of FIG. 19. As is apparent from FIG. 19, with the construction as with the present invention, using the annular sensor, the output of the sensor can be made stable. The reason for this is that when the distance between the peripheral face of the sensor and of the tone wheel increases at one part, the distance at the other parts is reduced resulting in little influence on the overall output of the sensor.

Due to the above described construction and operation of the speed sensing rolling bearing unit of the present invention, the output of the sensor can be increased without any particular size increase, so that the rotational speed detection for small size vehicles can be accurately carried out.

What is claimed is:

1. A rolling bearing unit fitted with a rotational speed detection unit comprising;
   a stationary outer ring having an inner peripheral face formed with a double row outer ring raceway thereon and an inner end opening,
   a rotatable inner ring assembly having an outer peripheral face provided opposite to the inner peripheral face of the stationary outer ring and formed with a double row inner ring raceway thereon,
   a plurality of rolling bodies provided so as to be freely rotatable between the outer ring raceway and the inner ring raceway,
   an annular tone wheel made from a magnetic material, fixed to an end portion of the inner ring assembly, and having a surface portion formed with a rotating cutout section for detection with a plurality of cutouts evenly spaced with a pitch in a circumferential direction,
   a cover fixed to the inner end opening of the outer ring and containing a synthetic resin therein, and
   an annular sensor comprising an annular coil, an annular permanent magnet and at least one annular stator and embedded in the synthetic resin retained in the cover so as to be faced to the rotating cutout section of the tone wheel, wherein the coil of the sensor is located radially inward than the rotating cutout section of the tone wheel.

2. A rolling bearing unit fitted with a rotational speed detection unit according to claim 1, wherein the inner ring assembly is made of a magnetic material, the annular permanent magnet of the sensor is magnetized in a predetermined one direction around the whole circumference and has two end faces in magnetized direction, the at least one stator is made from a magnetic material with one end portion thereof located close to or in contact with at least one of the two end faces in magnetized direction of the permanent magnet, and the annular coil is located along a part where the magnetic flux from the permanent magnet flows, and
   wherein a stationary cutout section having a plurality of cutouts is formed, with the same pitch as in the rotating cutout section, in the permanent magnet or the stator and opposed to the rotating cutout section of the tone wheel, and one end face in magnetized direction of the permanent magnet is faced to the rotating cutout section of the tone wheel either directly or through the stator across a first small clearance, while the other end face in magnetized direction of the permanent magnet is faced to one part of the surface of the inner ring assembly either directly or through the stator across a second small clearance.

3. A rolling bearing unit fitted with a rotational speed detection unit according to claim 2, wherein the cutouts in the stationary cutout section and the rotating cutout section has a pitch up to 3.9 mm.

4. A rolling bearing unit fitted with a rotational speed detection unit according to claim 2, wherein the magnetic flux flowing out of the end face in magnetized direction of the permanent magnet and into the stator and the tone wheel has a maximum density more than 1000 Gauss.

5. A rolling bearing unit fitted with a rotational speed detection unit according to claim 1, wherein a nut made of a magnetic material is secured to the inner ring assembly and has at least one part of an outer peripheral face formed as a cylindrical face concentric with the inner ring assembly, and
   wherein the annular permanent magnet of the sensor is magnetized in a predetermined one direction around the whole circumference and has two end faces in magnetized direction, the at least one stator is made from a magnetic material with one end portion thereof located close to or in contact with at least one of the two end faces in magnetized direction of the permanent magnet, and the annular coil is located along a part where the flux from the permanent magnet flows, and
   wherein a stationary cutout section having a plurality of cutouts is formed, with the same pitch as in the rotating cutout section, in the permanent magnet or the stator and opposed to the rotating cutout section of the tone wheel, and one end face in magnetized direction of the permanent magnet is faced to the rotating cutout section of the tone wheel either directly or through the stator across a first small clearance, while the other end face in magnetized direction of the permanent magnet is faced to the cylindrical face of the nut either directly or through the stator across a second small clearance.

6. A rolling bearing unit fitted with a rotational speed detection unit according to claim 1, wherein the inner ring assembly comprises a hub for removably fixing a vehicle wheel, an inner ring externally fitted to the hub, and a nut threaded onto a threaded portion on an inner end of the hub, for axially retaining the inner ring,
   wherein the tone wheel has a smaller diameter portion having an outer end rim and externally fixed to an inner end of the inner ring, a larger diameter portion thereof located around the periphery of the nut, and a step portion connecting the outer end rim of the larger diameter portion to the inner end rim of the smaller diameter portion, and the rotating cutout section is provided at least in the inner peripheral face of the larger diameter portion of the tone wheel, and
   wherein the annular permanent magnet of the sensor is magnetized in a predetermined one direction around the whole circumference and has two end faces in magnetized direction, the at least one stator is made from a magnetic material with one end portion thereof located close to or in contact with at least one of the two end faces in magnetized direction of the permanent magnet, and the annular coil is located along a part where the flux from the permanent magnet flows, and the sensor is provided radially inside the larger diameter portion of the tone wheel, and wherein one end face in magnetized direction of the permanent magnet is located magnetically close to and faced to one part of the tone wheel across a first small clearance, and the one end portion of the stator is located in contact with or close to the other end face in magnetized direction of the permanent magnet, with the other end portion of the stator located magnetically close to and faced to another part of the tone wheel across a second small clearance, such that at least one of the one part or the other part of the tone wheel forms the rotating cutout section for detection, while a stationary cutout section having a plurality of cutouts is formed with the same pitch as in the rotating cutout section, in at least one of the other end portion of the stator and a part which is magnetically connected to the one end face in magnetized direction of the permanent magnet, and opposed to the rotating cutout section for detection.

7. A rolling bearing unit fitted with a rotational speed detection unit according to claim 6, wherein the stator is provided as a pair, and the one end face in magnetized direction of the permanent magnet is located magnetically close to and faced to the one part of the tone wheel through the stator across a first small clearance.

8. A rolling bearing unit fitted with a rotational speed detection unit according to claim 6, wherein the sensor has an inner diameter which is larger at a portion faced to the outer peripheral face of the nut, and smaller at a portion axially away from the outer peripheral face of the nut.

9. A rolling bearing unit fitted with a rotational speed detection unit according to claim 1, wherein the tone wheel is of cylindrical shape, and the permanent magnet and coil constituting the sensor are located radially inside the tone wheel, a synthetic resin is internally fixed in the cover with the sensor embedded therein, and at least one of the permanent magnet and the coil has at least one part which is projected axially toward with a radially inside portion of the tone wheel from the synthetic resin.

10. A rolling bearing unit fitted with a rotational speed detection unit according to claim 1, wherein at least one of the permanent magnet, the at least one stator and the coil constituting the sensor has a portion which is faced to the rotating cutout section of the tone wheel and exposed from the synthetic resin.

11. A rolling bearing unit fitted with a rotational speed detection unit according to claim 1, wherein the cover forms an annular space with reference to part of the inner ring assembly, and the annular sensor is partly positioned in the annular space.

12. A rolling bearing unit fitted with a rotational speed detection unit according to claim 11, wherein the inner ring assembly is made of a magnetic material, the permanent magnet of the sensor is magnetized in a predetermined one direction around the whole circumference and has two ends in magnetized direction, the at least one stator is made from a magnetic material with one end portion thereof located close to or in contact with at least one of the two ends in magnetized direction of the permanent magnet, and the coil is located along a part where the magnetic flux from the permanent magnet flows, and wherein a stationary cutout section having a plurality of cutouts is formed, with the same pitch as in the rotating cutout section, in the permanent magnet or the stator and opposite to the rotating cutout section of the tone wheel, and one end in magnetized direction of the permanent magnet is faced to the rotating cutout section of the tone wheel either directly or through the stator across a first small clearance, while the other end in magnetized direction of the permanent magnet is faced to one part of the surface of the inner ring assembly either directly or through the stator across a second small clearance.

13. A rolling bearing unit fitted with a rotational speed detection unit according to claim 11, wherein a nut made of a magnetic material is secured to the inner ring assembly and has at least one part of an outer peripheral face formed as a cylindrical face concentric with the inner ring assembly thereby partly defining the annular space, and wherein the permanent magnet of the sensor is magnetized in a predetermined one direction around the whole circumference and has two ends in magnetized direction, the at least one stator is made from a magnetic material with one end portion thereof located close to or in contact with at least one of the two ends in magnetized direction of the permanent magnet, and the annular coil is located along a part where the flux from the permanent magnet flows, and wherein a stationary cutout section having a plurality of cutouts is formed, with the same pitch as in the rotating cutout section, in the permanent magnet or the stator and opposed to the rotating cutout section of the tone wheel, and one end in magnetized direction of the permanent magnet is faced to the rotating cutout section of the tone wheel either directly or through the stator across a first small clearance, while the other end in magnetized direction of the permanent magnet is faced to the nut either directly or through the stator across a second small clearance.

14. A rolling bearing unit fitted with a rotational speed detection unit according to claim 11, wherein the inner ring assembly comprises a hub for removably fixing a vehicle wheel, an inner ring externally fitted to the hub, and a nut threaded onto a threaded portion on an inner end of the hub, for axially retaining the inner ring to partly define the annular space, wherein the tone wheel has a smaller diameter portion having an outer end rim and externally fixed to an inner end of the inner ring, a larger diameter portion thereof located around the periphery of the nut, and a step portion connecting the outer end rim of the larger diameter portion to the inner end rim of the smaller diameter portion, and the rotating cutout section is provided at least in the inner peripheral face of the larger diameter portion of the tone wheel, and wherein the permanent magnet of the sensor is magnetized in a predetermined one direction around the whole circumference and has two ends in magnetized direction, the at least one stator is made from a magnetic material with one end portion thereof located close to or in contact with at least one of the two ends in magnetized direction of the permanent magnet, and the annular coil is located along a part where the flux from the permanent magnet flows, and the sensor is provided radially inside the larger diameter portion of the tone wheel, and wherein one end in magnetized direction of the permanent magnet is located magnetically close to and faced to one part of the tone wheel across a first small clearance, and the one end portion of the stator is located in contact with or close to the other end in magnetized direction of the permanent magnet, with the other end portion of the stator located magnetically close to and faced to another part of the tone wheel across a second small clearance, such that at least one of the one part or the other part of the tone wheel forms the rotating cutout section for detection, while a stationary cutout section having a plurality of cutouts is formed with the same pitch as in the rotating cutout section, in at least one of the other end portion of the stator and a part which is magnetically connected to the one end in magnetized direction of the permanent magnet, and opposed to the rotating cutout section for detection.

15. A rolling bearing unit fitted with a rotational speed detection unit according to claim 11, wherein the inner ring assembly comprises a hub for removably fixing a vehicle wheel, an inner ring externally fitted to the hub, and a nut threaded onto a threaded portion on an inner end of the hub, for axially retaining the inner ring to partly define annular space, wherein the tone wheel has a smaller diameter portion having an outer end rim and externally fixed to an inner end of the inner ring, a larger diameter portion thereof located around the periphery of the nut, and a step portion connecting the outer end rim of the larger diameter portion to the inner end rim of the smaller diameter portion, and the rotating cutout section is provided at least in the inner peripheral face of the larger diameter portion of the tone wheel, and wherein the permanent magnet of the sensor in a disc shape is located axially away from the nut magnetized in a predetermined one direction around the whole circumference and has two ends in magnetized direction, the at least one stator is made from a magnetic material with one end portion thereof located close to or in contact with at least one of the two ends in magnetized direction of the permanent magnet, and the annular coil is located along a part where the flux from the permanent magnet flows, and the sensor is provided radially inside the larger diameter portion of the tone wheel, and the coil is located radially outside the nut, and wherein one end in magnetized direction of the permanent magnet is located magnetically close to and faced to one part of the tone wheel across a first small clearance, and the one end portion of the stator is located in contact with or close to the other end in magnetized direction of the permanent magnet, with the other end portion of the stator located magnetically close to and faced to another part of the tone wheel across a second small clearance, such that at least one of the one part or the other part of the tone wheel forms the rotating cutout section for detection, while a stationary cutout section having a plurality of cutouts is formed with the same pitch as in the rotating cutout section, in at least one of the other end portion of the stator and a part which is magnetically connected to the one end in magnetized direction of the permanent magnet, and opposed to the rotating cutout section for detection.

* * * * *